INVENTORS
ROBERT VIRET
ALAIN STAHL

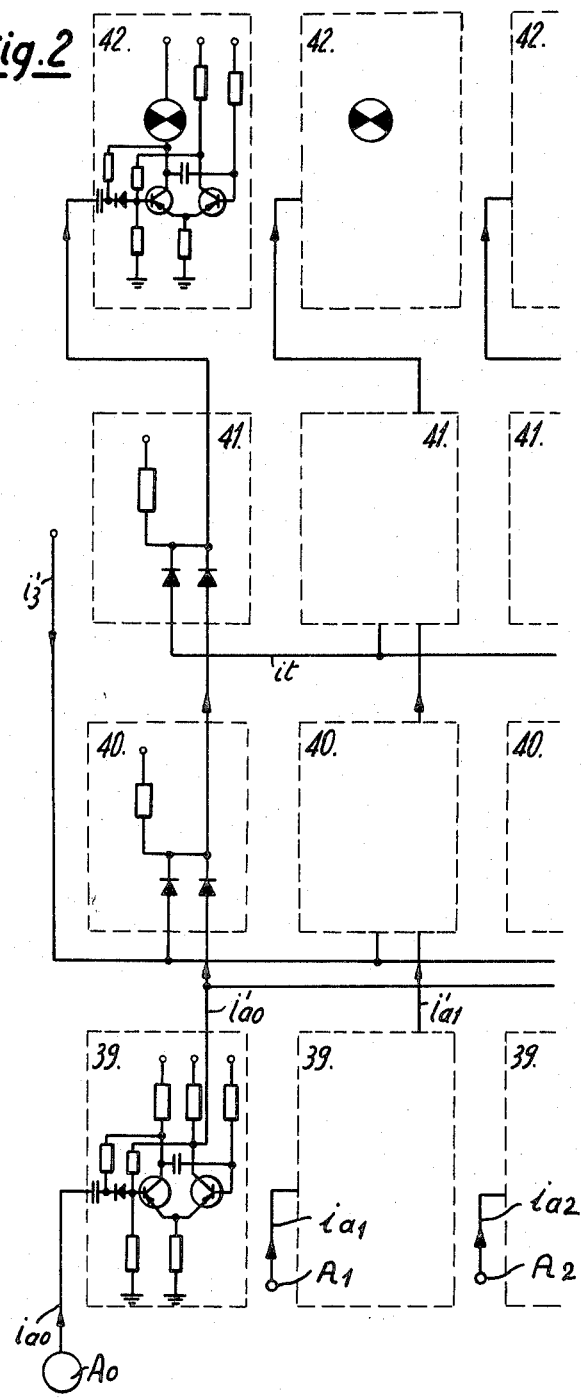

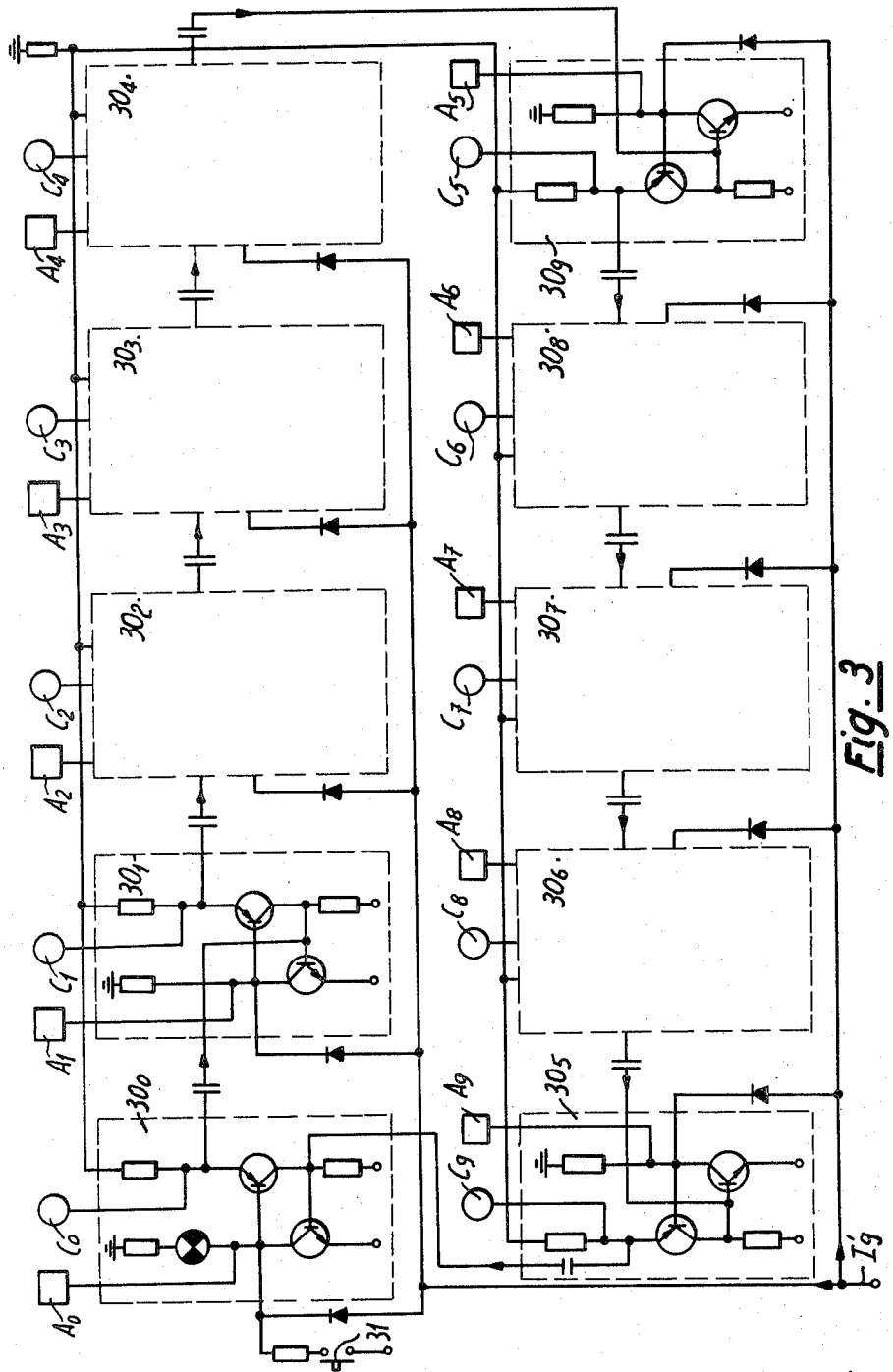

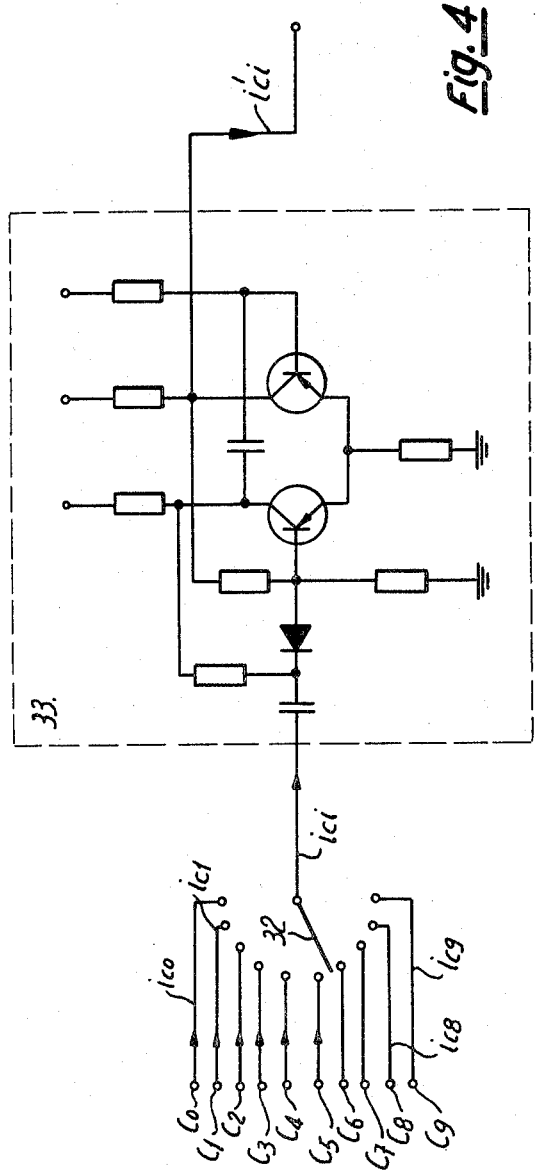

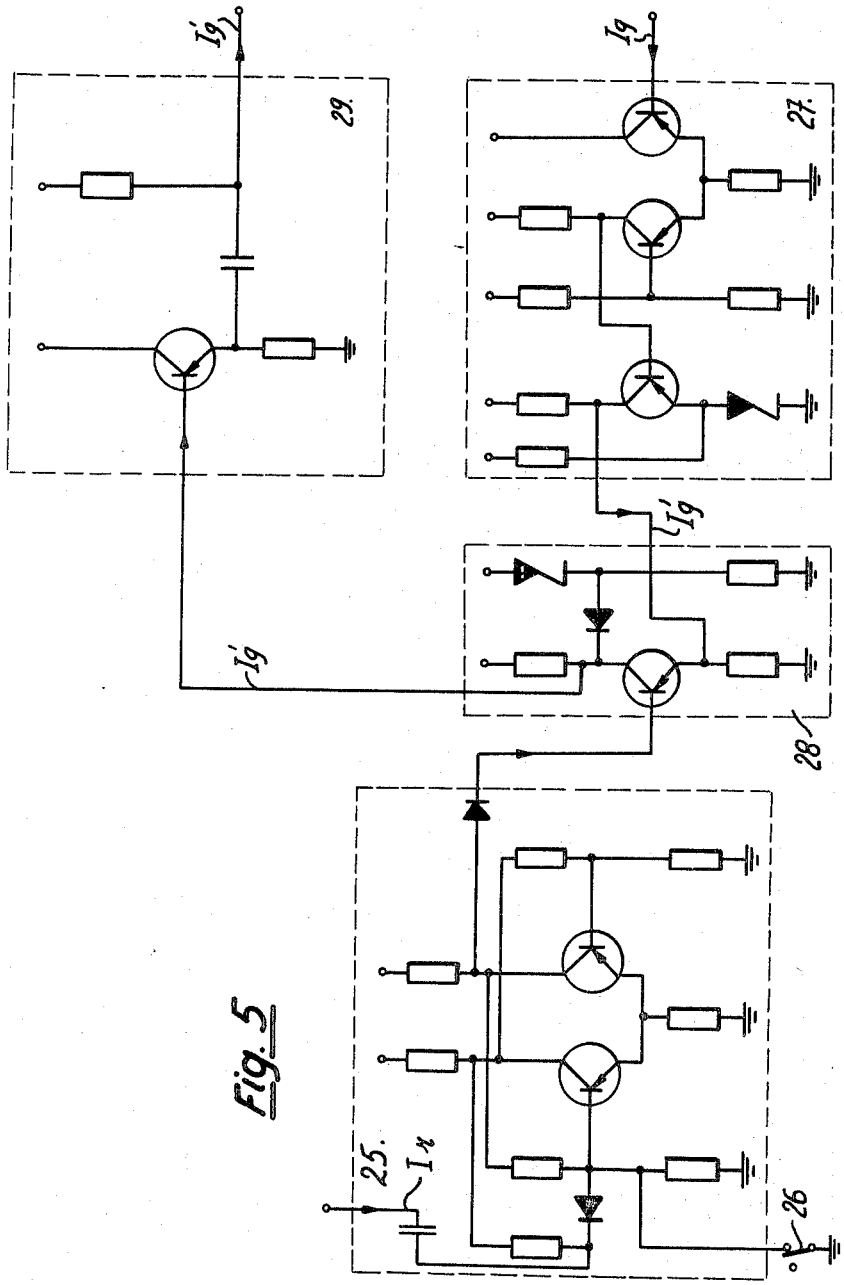

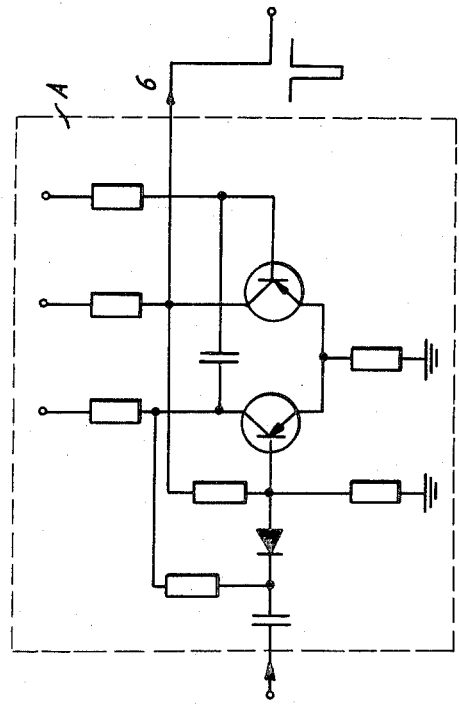
Fig.6
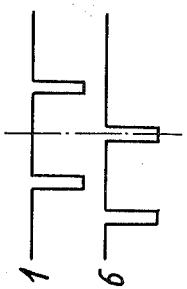
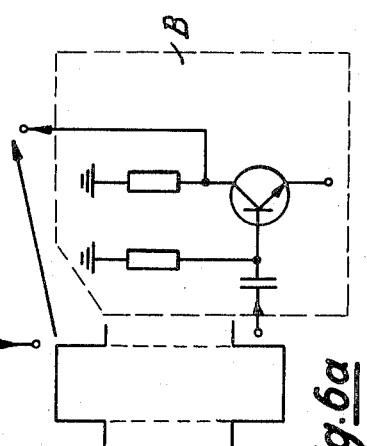
Fig.6a
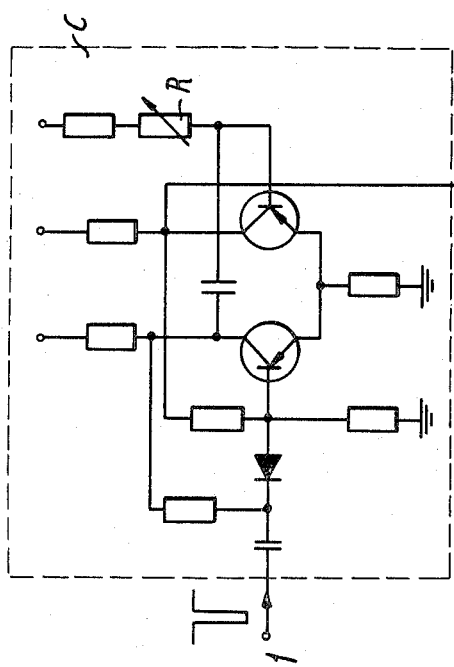
Fig.6b
INVENTORS
ROBERT VIRET
ALAIN STAHL
By Young & Thompson
ATTYS.

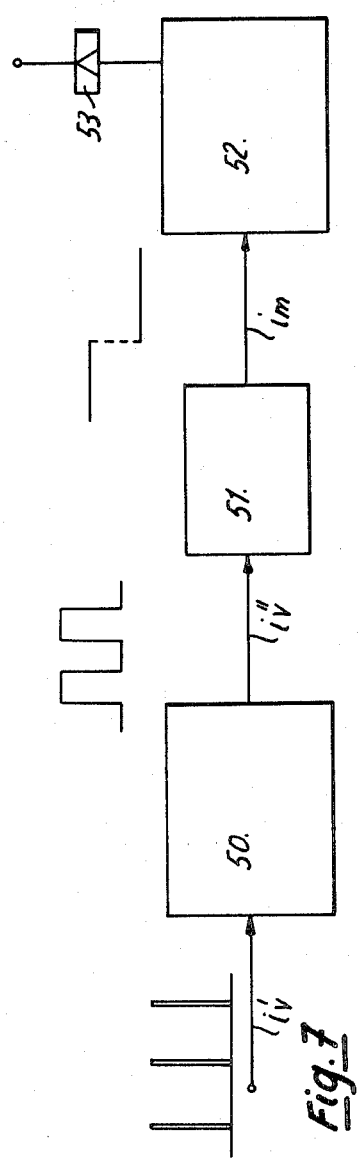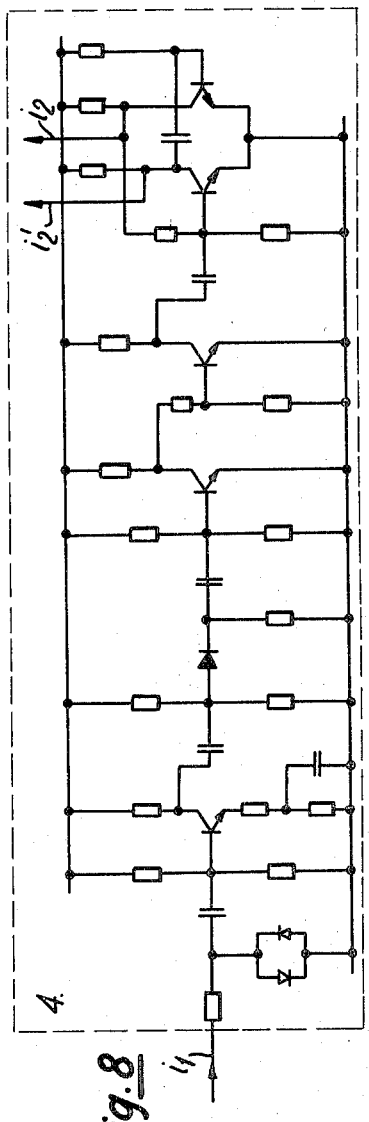
Fig. 7
Fig. 8

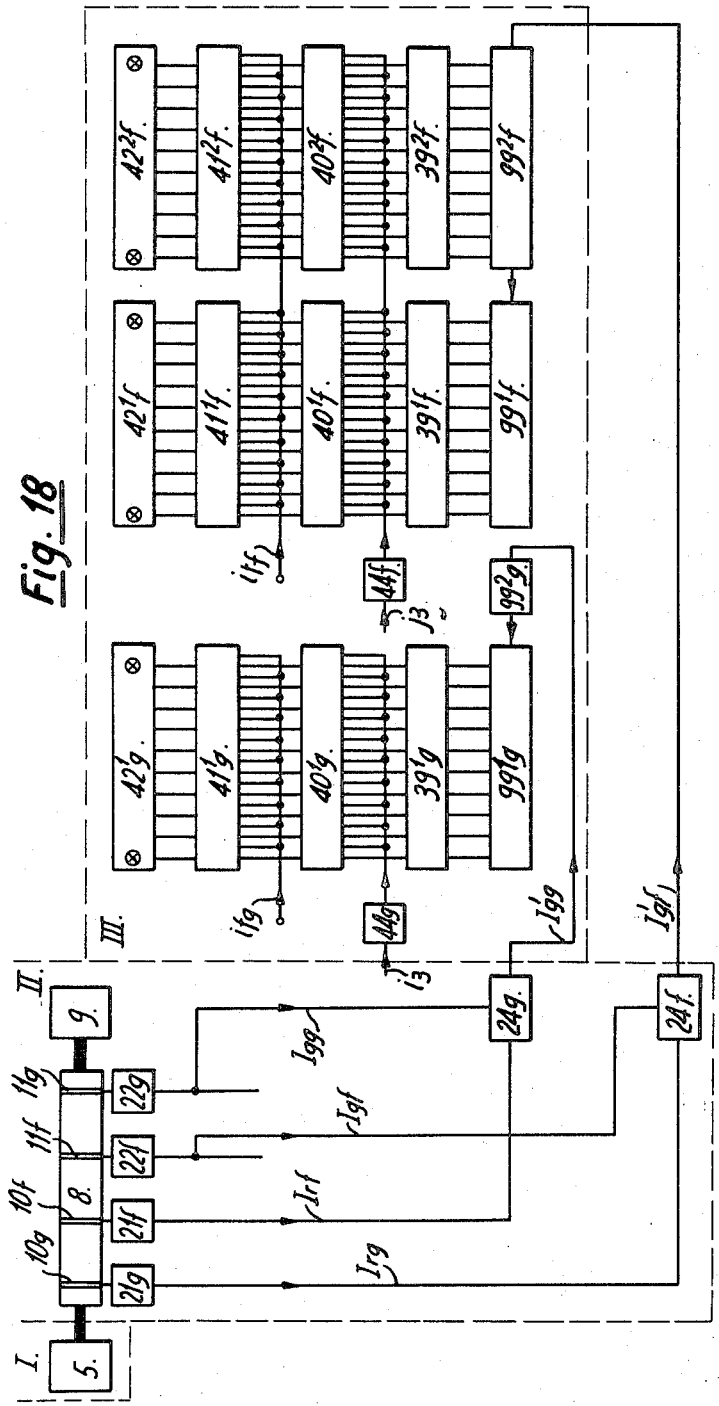

3,346,848
DISPLACEMENT CONTROL SYSTEM
Robert Viret and Alain Stahl, Geneva, Switzerland, assignors to Societe Genevoise d'Instruments de Physique, Geneva, Switzerland, a corporation of Switzerland
Filed June 25, 1965, Ser. No. 467,032
Claims priority, application Switzerland, July 1, 1964, 8,623/64
31 Claims. (Cl. 340—172.5)

This invention relates to displacement control systems, and is particularly concerned with a displacement control system of the type adapted to selectively and accurately position a movable member in a predetermined location along a given path of travel thereof.

Control devices for the displacement of movable members are generally servo-systems in which the comparison of a control signal with a position signal indicating the actual or instant position of the movable member is used to deliver an error signal, which error signal in turn, controls a servo-motor causing the desired displacement of the movable member. When both the control and position signals have a predetermined relationship therebetween, e.g., identical signals of opposite phase, the movable member has reached its desired position and the comparison of the two signals delivers a zero error signal, thus stopping further displacement of the movable member by means of the servo-motor. While such control devices generally operate in this described manner, the prior displacement control devices as used in combination with movable members can generally be divided into two classes, namely, the analogue devices and the digital or numeric devices.

In the analogue devices, the control information is expressed in the form of a value relative to the desired position of the movable member. For example, the desired position is translated into one or more electrical signals, the amplitude or phase of which is proportional to the distance separating the desired position of the movable member and a so-called origin or reference position. The analogue devices possess the advantage of being relatively simple. The translation of the position of the movable member into an analogue electrical signal or signals is easily realized. The control information signal and the signal corresponding to the actual position of the movable member, being both analogue in form, facilitate a comparison of the signals for control of the servo-motor. However, the precision of the analogue systems is dependent upon the amplitude of the variation of the analogue signal or signals that can be detected, i.e., it is dependent upon the sensitivity of the control device. Further, if the translation of the control information into analogue form is not difficult, the storage of such information often necessitates delicate means, such as magnetic tapes or drums.

In the digital or numeric devices, the control information is expressed under numeric decimal form, or more frequently, in binary form. For example, the desired position is determined by the position of a selector switch and/or by a combination of perforations on a tape. The storage of the numeric control information is easier than that which must be utilized with analogue control information. The precision of the digital control information, however, depends on the number of ciphers, numerals, or decades expressed. Theoretically, this precision is not limited, but certain problems are posed because the control information signal and the information signals relative to the actual position of the movable member have to be of the same nature to be compared for purposes of forming an error signal which in turn controls the servo-motor and thus the displacement of the movable member.

There have been several suggestions as to the manner in which to achieve control information signals and actual information signals of the same nature for use in systems such as described immediately above. Certain known devices translate the actual position of the movable member into digital form by means of a coder, for example, a switching device including a disc having a combination of conducting and insulating areas thereon which provide control signals through selective current paths established by brushes. The precision of such a translation technique depends on the number of decoders used. The working of the coder at the limit between two ciphers or digits (i.e., between a conductive area and an insulating area in the example under consideration), presents particular problems. Certain codes prevent several changes of ciphers occurring simultaneously and while this reduces the difficulty, it does not suppress it.

In other known devices, the actual position of the movable member is translated into a number of pulses, which number is proportional to the distance separating the actual position of the member from the reference position. A pulse counter actuates the servo-motor so that the same modifies the position of the movable member as long as the number of pulses corresponding to the desired position is not reached. These devices are relatively simple, but if there is one bad contact, then a pulse can easily be lost during the counting, and in this event, the error affects all of the following positions of the movable member.

Still further devices which have previously been proposed incorporate an oscillator to form a pulse train intended to represent the reference position of the movable member. The pulses are counted in two different counters. One counter is capable of being partially "prefilled" by means of control information, which would be, in that case, representative of a given number of pulses. The output signals of both of the counters are thus out of phase, with the phase displacement having a value corresponding to the control information. The comparison of signals thus delivers an error signal which may actuate a servo-motor controlling the displacement of the movable member. It is, however, to be noted that these devices enable the desired control only of the amplitude of a displacement of the movable member. They are not able to locate the movable member in a desired position if the actual position of the movable member, before the control of its displacement, is not known. Further, mere existence of a counting error during the "prefilling" of one of the counters introduces an error.

Another type of device previously proposed also uses an oscillator to form an information signal relative to the desired position of the movable member. Such device incorporates a sequential counter fed by a second oscillator. The outputs each deliver a signal corresponding to one amplitude for the desired displacement of the movable member. A comparison device compares successively each output of the counter with the information delivered by the first oscillator until identity between these signals is reached. Here again, one counting error displaces the value of the output signals of the counter, thus leading to a false control of the position of the movable member.

Finally, in other devices, the actual position of the movable member is translated into analogue form, for example, into a current amplitude. The control information is also translated into analogue form, by means of a multiple tap transformer, for example, each tap of which, through selection by a suitable selector switch, corresponds to a cipher or digit. The selector switch can be actuated manually or controlled in known manner by means of a punch tape. The comparison of the analogue form is easier to use for the control of a servo-motor, since in most cases, it suffices to amplify the error signal resulting from the comparison. However, the precision of these devices depends, like the precision of the purely analogue devices, on the difference between the control information and the information relative to the actual position of the movable member that can be detected.

The present invention is directed to the provision of a displacement control device or system for positioning a movable member, which device or system tends to overcome the above-explained disadvantages of the previous systems. More particularly, the present invention has a primary object, the provision of a displacement control system which is not subject to the drawbacks of the prior art and which obtains the advantages of translating information into analogue form while eliminating the poor precision characteristics commonly associated with such techniques previously. Further, it is an object of the present invention to provide such a displacement control device or system which overcomes the limitations imposed by prior digital control systems, which further is not subject to counting errors, and which allows for locating the movable member being controlled virtually without regard to its prior position.

Consistent with the foregoing objects, but still more specifically, a primary object of the present invention is to provide a displacement control device which insures precision since it does not depend on an amplitude relationship between signals as such, but instead operates with what might be regarded as control signals accurately representing stored and position signals that facilitate the production of an error signal which, in turn, is used to locate the movable member under the control of the system.

Auxiliary, but still important further objects of the present invention include the provision of such a system which can easily, and preferably does, incorporate means for warning an operator in the event the system is not working satisfactorily, and if desired and preferably, further means for immediately stopping movement of the movable member in the event of a system malfunction. More particularly in this regard, the overall system hereof, as explained more fully below, incorporates a sequential counting device or counter which serves to supply what might be deemed a reference signal to a comparison device wherein the reference signal is compared against a signal representing the instantaneous and actual position of the movable member to develop an error signal, which error signal essentially controls the servo-mechanism actually moving the member under control.

Accordingly, consistent with the last-mentioned object, a significant aspect of the invention concerns the provision of a safety check or survey means which operates in association with the system to warn an operator in the event of a counter malfunction and to stop the movable member positioning upon existence of a malfunction so as to permit immediate readjustment.

According to the invention, a transducer or indicating device or means is utilized to develop a signal representative of the actual or instantaneous position of the movable member. An actuating device controls the displacement of such movable member. Further, a counter or sequential counting device is utilized. This counter comprises a rotary magnetic memory storage means on which at least one analogue electronic endless graduation is stored. Such graduation corresponds to a succession of signals accurately representative of the positions of the movable member.

A reading means or pickup is associated with the magnetic memory storage means to deliver an electrical signal constituted by pulse trains and representing the repetitive reading of the graduation. A counter network is fed by the aforesaid electrical signal and has a number of outputs which correspond to the number of divisions of the graduation on the magnetic memory storage means and in turn to the number of pulses contained in each pulse train of the electrical signal. The counter delivers on each output the pulses corresponding to the order number of the output. A selection device or selector means is coupled with the outputs of the counter to selectively derive a given output therefrom and feed the same to a comparator device or means which compares the signals delivered by the indicating device or transducer with the selected output signals of the counter to thereby derive an error signal which controls the actuating device.

The preferred embodiments of the invention, as well as the overall invention itself, will be better understood, and objects other than those specifically set forth above will be appreciated, when consideration is given to the following detailed description. Such description makes reference to the annexed drawings wherein a preferred system constructed in accordance herewith is presented.

In the drawings:

FIGURE 1 represents the control system hereof where control is exercised over a single "decade";

FIGURES 2 and 2A are schematic diagrams, partially detailed of a preferred form of display device incorporated in the system of FIGURE 1;

FIGURE 3 is a schematic diagram, partially detailed of a ring counter arrangement incorporated in the system of FIGURE 1;

FIGURE 4 is a detailed schematic diagram of an output stage of the counter of FIGURE 3;

FIGURE 5 is a detailed schematic view of a counter control device preferably incorporated in the system of FIGURE 1;

FIGURE 6 is a detailed schematic view of a monostable multivibrator arrangement utilized with the system of FIGURE 1;

FIGURE 6A is a detailed schematic view of an inverter stage utilized preferably with the system of FIGURE 1;

FIGURE 6B is a detailed schematic view of a monostable multivibrator having an adjustable time constant and utilized also in the system of FIGURE 1;

FIGURE 7 is a block diagram of a reliability means or device to be used in association with the control device incorporated in the system of FIGURE 1;

FIGURE 8 is a schematic diagram of a pulse shaping circuit utilized for shaping signals delivered by a synchro as used with the system of FIGURE 1;

Figure 1:
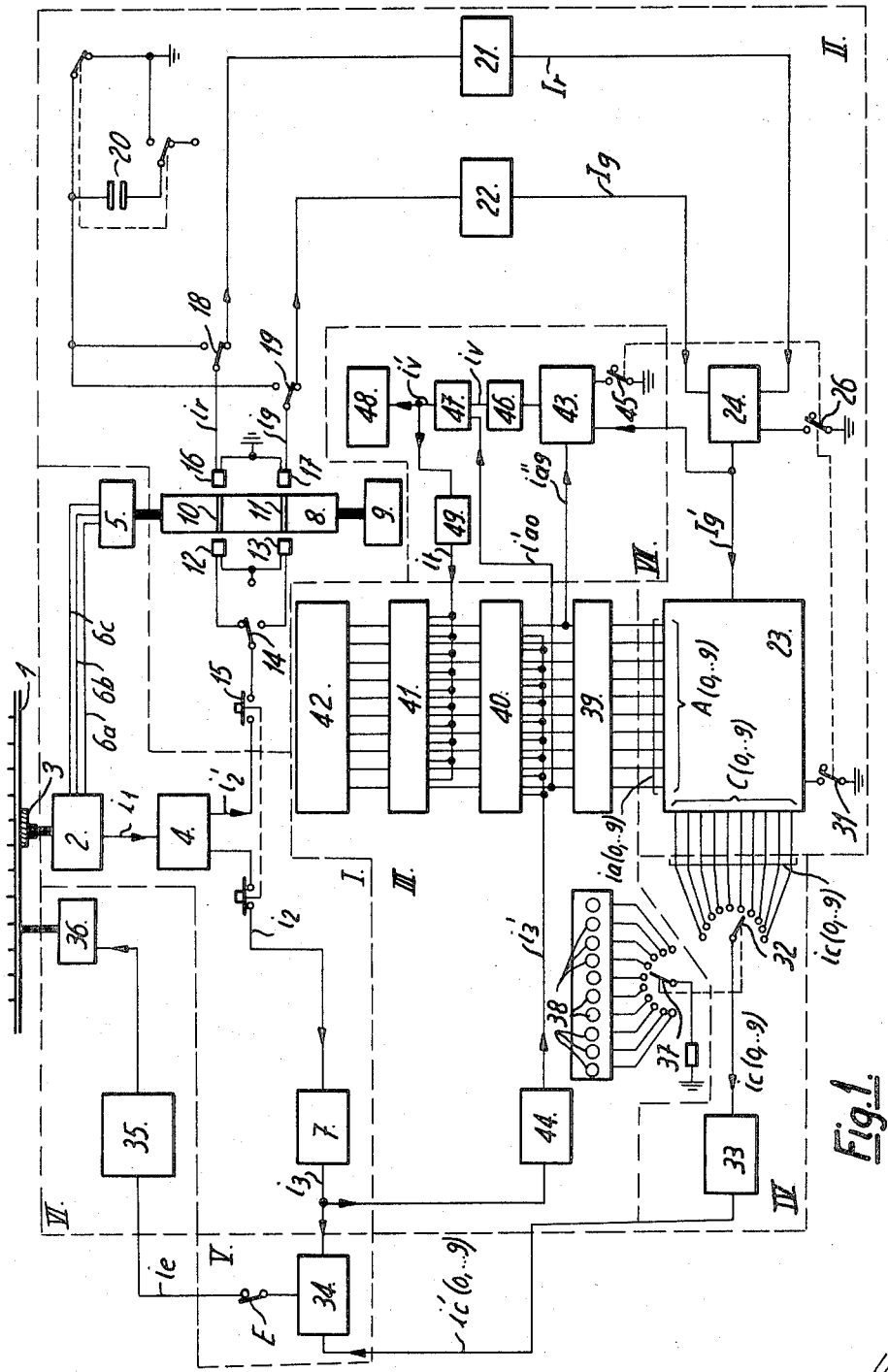
FIGURE 1 is a schematic block diagram of a system constructed in accordance with the present invention and presents such system as the same would be provided to selectively move a given member to any one of ten positions—i.e.
Figure 12:
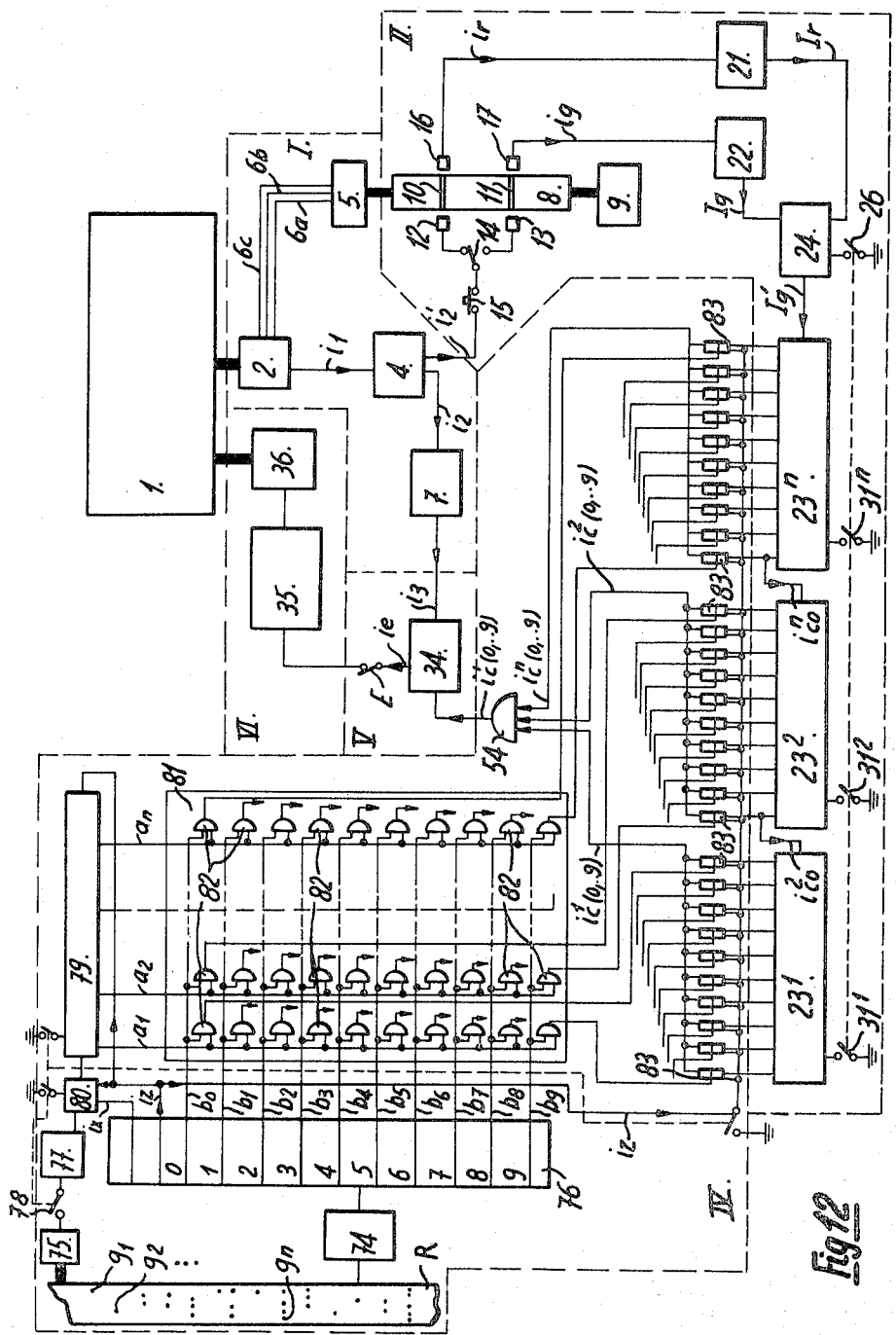
FIGURE 12 is a schematic block diagram of a second embodiment of a system constructed in accordance herewith but designed to operate with any given selected number of decades, rather than a single decade.
Figure 13:
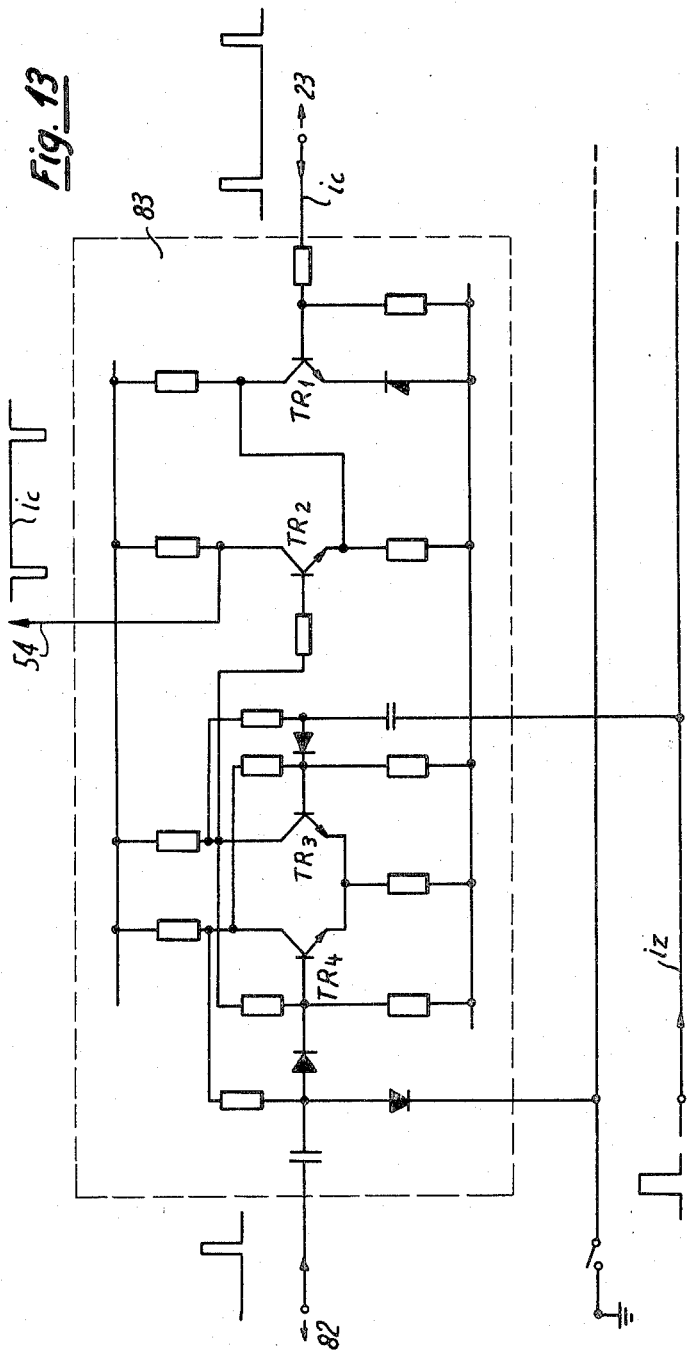
Figure 14:
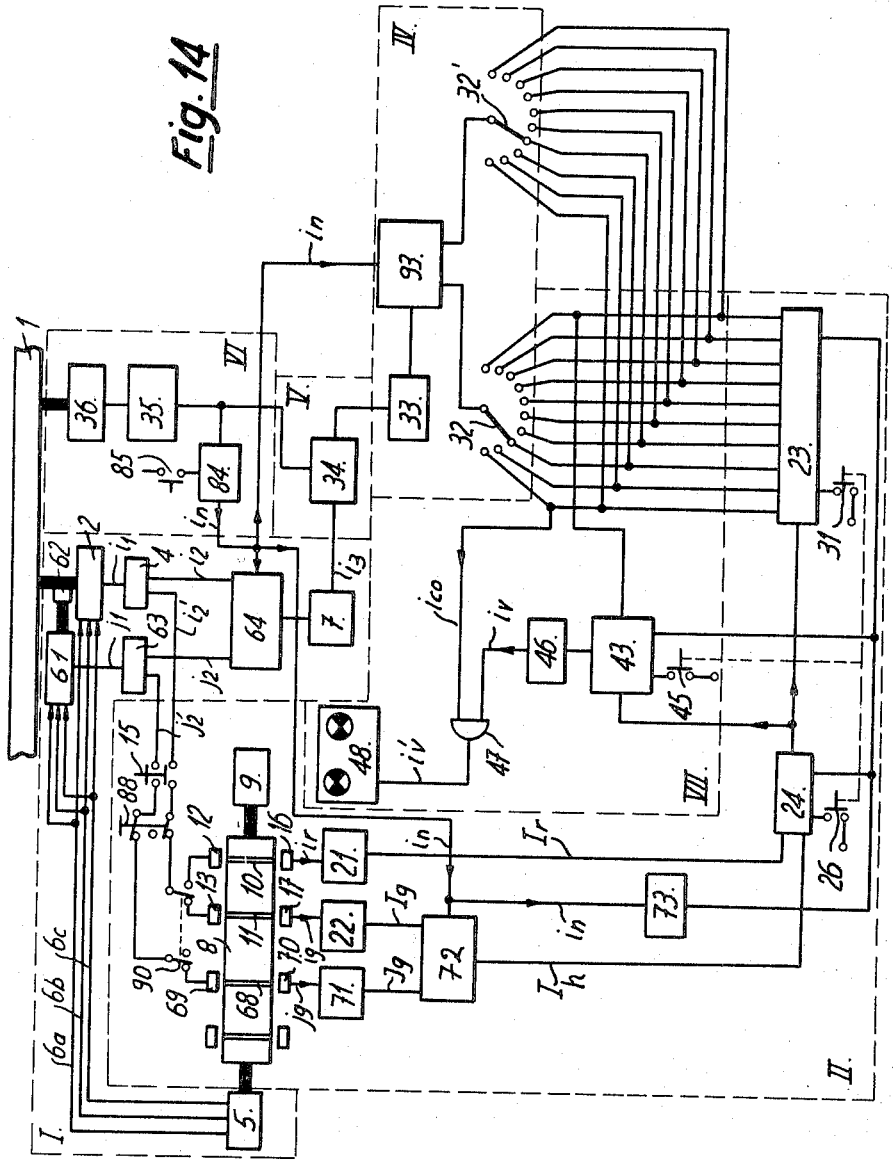
Figure 15:
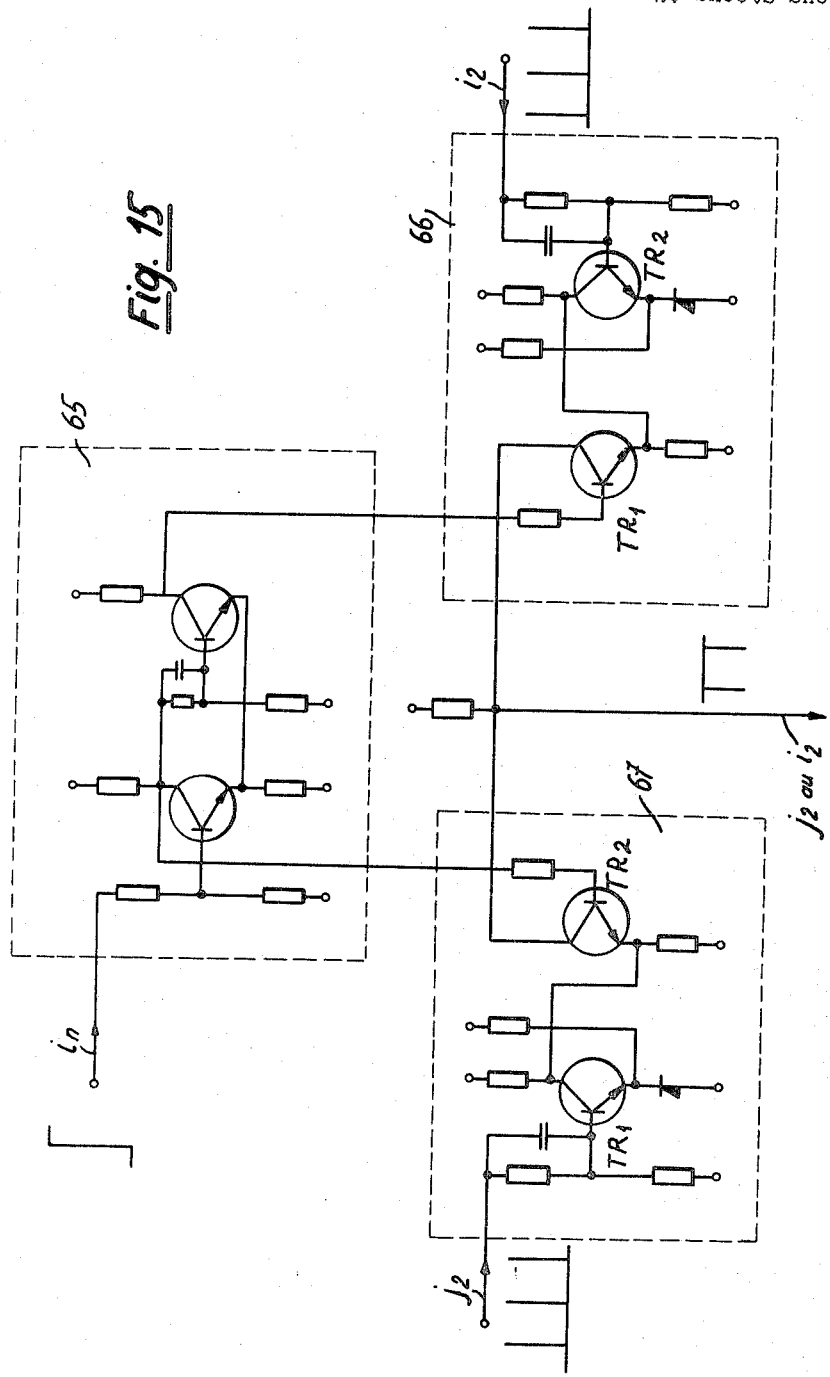
Figure 16:
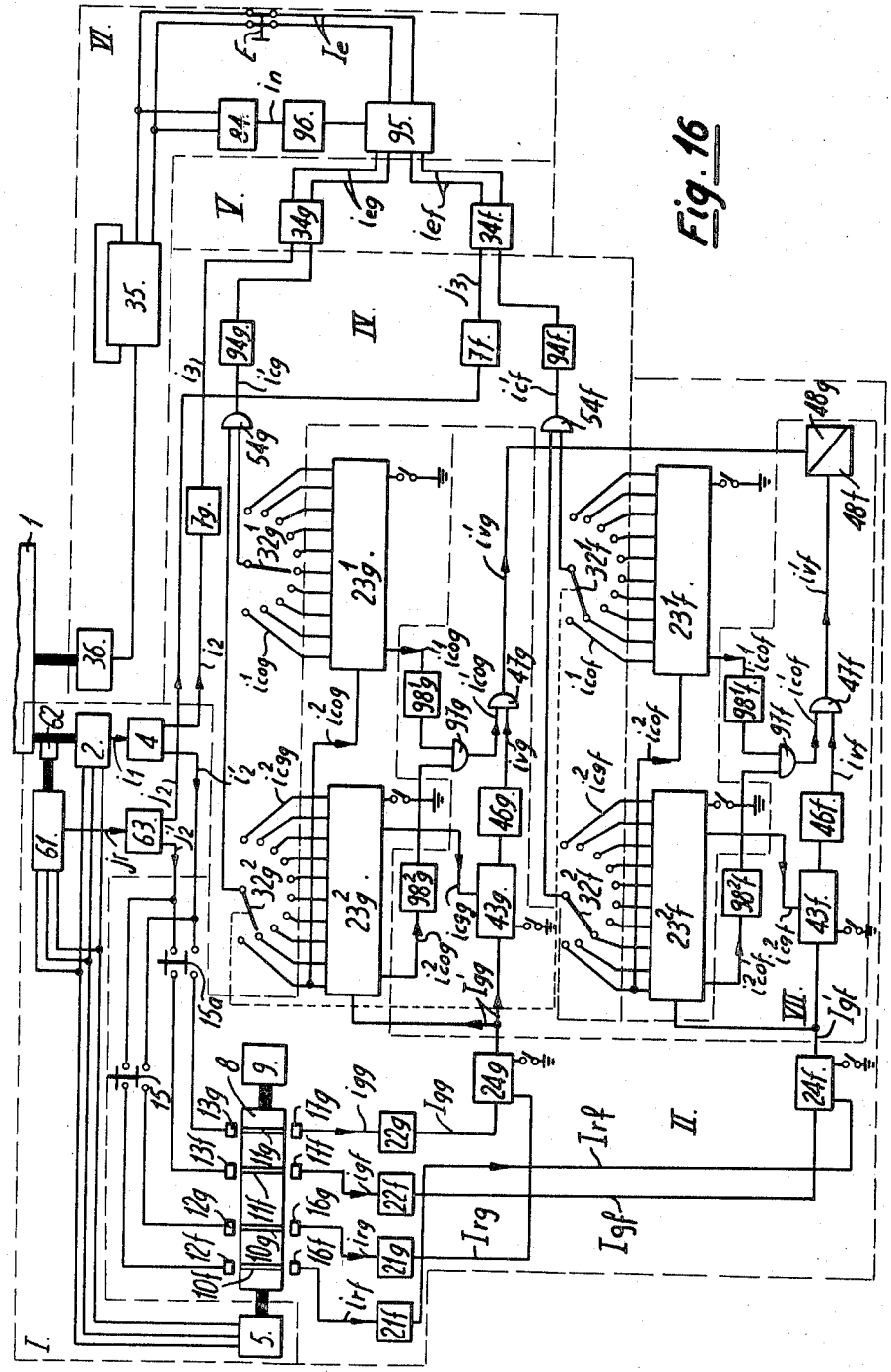
Figure 17:
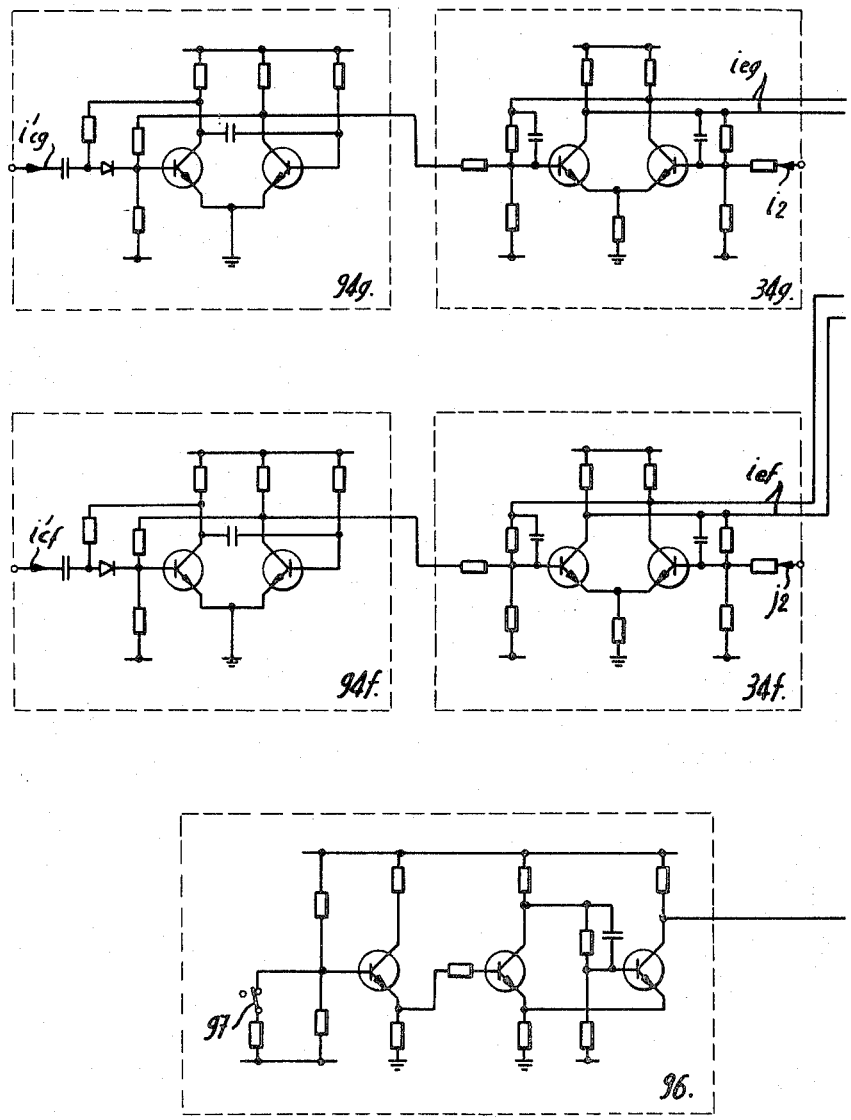
Figure 17A:
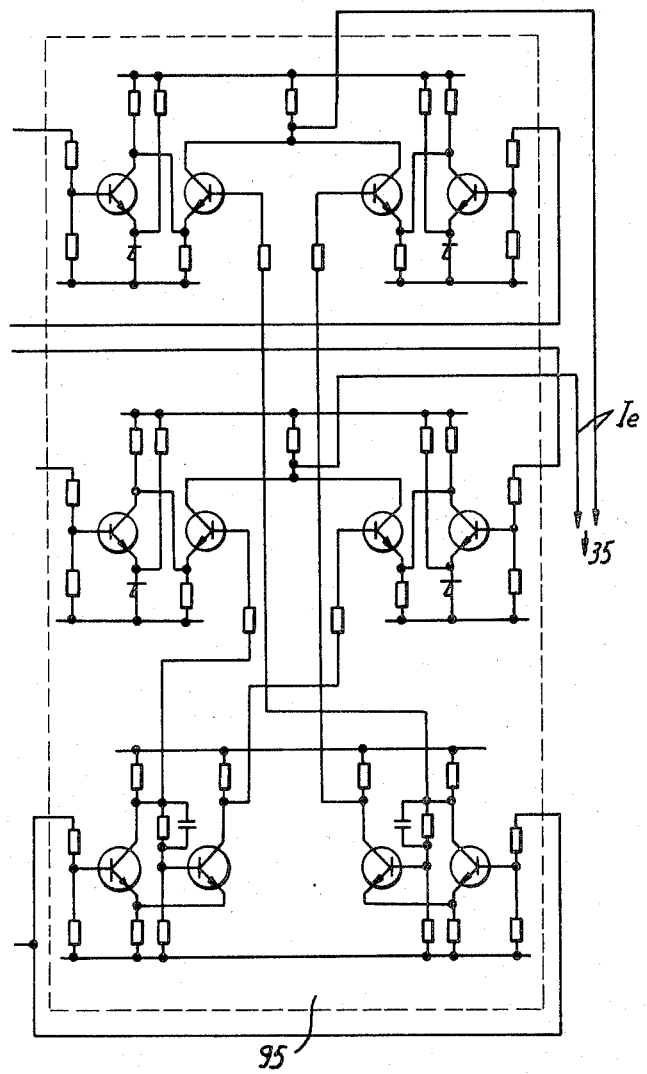

FIGURE 13 presents a detailed schematic circuit of a gate preferably used in the systems of FIGURES 1 and 12;

FIGURE 14 is a schematic block diagram of a third embodiment of a control system constructed in accordance herewith wherein two electronic analogue graduations are utilized with each corresponding to one decade;

FIGURE 15 is a detailed schematic circuit of an electronic switch utilized preferably in systems provided hereby;

FIGURE 16 is a schematic block diagram of a fourth embodiment of a control system constructed in accordance herewith wherein two electronic analogue graduations are utilized with each corresponding to two "decades" rather than a single decade;

FIGURES 17 and 17A are detailed schematic circuits illustrating the relationship therebetween and in turn, partial operation of a system made in accordance with the fourth embodiment hereof; and, FIGURE 18 is a schematic block diagram showing a display device arrangement constructed in accordance herewith for utilization with the systems hereof.

As set forth hereinabove, the control system of the present invention operates preferably to control the displacement of a movable member. To this end, the control information is represented by the desired stop position or signal with respect to an arbitrarily determined reference position of a movable member. This operating technique can be best understood if one first considered a somewhat simplified embodiment of the present invention such as the embodiment presented in FIGURE 1.

Figure 1A:
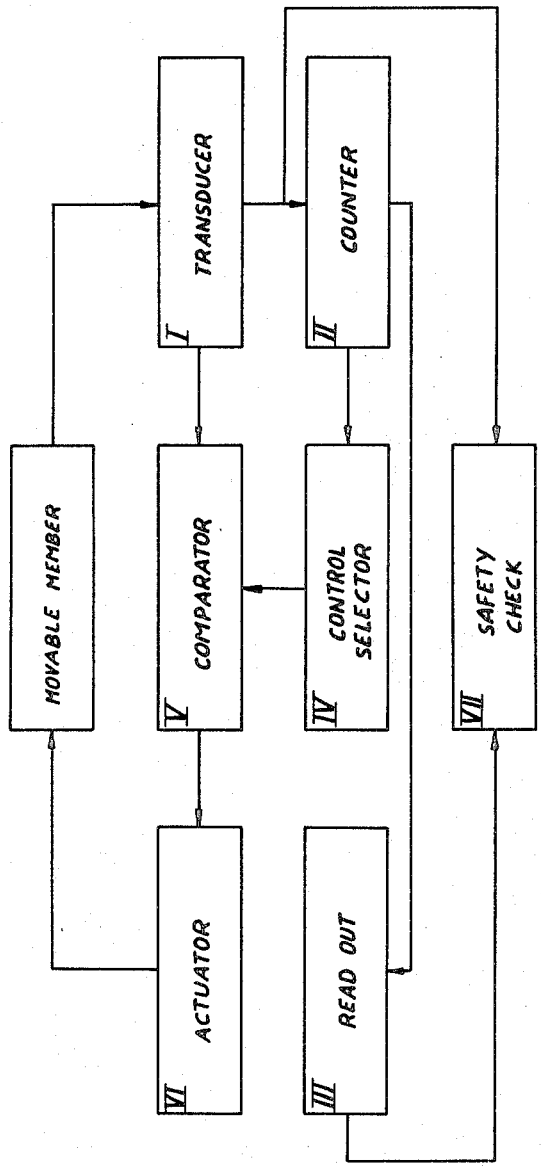
FIGURE 1A is a schematic block diagram showing the system of FIGURE 1 in its simplest form.

By referring to FIGURE 1, it will be noted that the main circuits thereof are contained within phantom line blocks respectively designated by numerals I–VI. The details of the circuits utilized in each of these blocks are illustrated in FIGURES 2 through 10. Briefly, the overall system, as shown in FIGURE 1A, includes a transducer or indicating device I which develops a signal accurately representative of the position of the movable member 1 with respect to a start or reference position thereof; a sequential counting device or counter II which derives its input from the transducer I; a display device or readout III which produces a signal of the actual and/or desired position of the movable member; a selection device or control selector IV which derives its input from the counter II; a comparator or comparator device V which compares the electrical signals delivered to it by the transducer I with the electrical signals delivered to it by the control selector IV to produce an error signal; and an actuator VI which responds to the error signal to move or position the movable member as desired. Further, the system preferably incorporates a safety check or survey device VII which essentially surveys the operation of the counter II to determine the propriety of the functioning thereof.

The transducer indicating device I as shown in FIGURE 1, preferably comprises a synchro 2 which has its rotor mechanically connected by a gear train 3 to the movable member 1. However, it should be here understood that the use of a synchro is not essential, and that other transducing devices may be incorporated. For example, the synchro may well be replaced by a photo-electric microscope of the type described in a booklet entitled, Development and Applications of Photo-Electric Microscopes, as reprinted from Advances in Machine Tool Design and Research Conference, Proceedings of the 4th International M.T.D.R. Conference held at Manchester, September 1963, Pergamon Press, 1964, such booklet bearing No. 1323 and naming the authors as André Mottu and Jacques Pettavel, Societe Genevoise d'Instruments de Physique, Geneva.

While a photo-electric microscope can be used to derive basic signals consistent herewith and as the transducer means, the invention is described hereinafter in connection with a synchro 2 such as shown in FIGURE 1 for purposes of convenience. However, from such description, it will be apparent that the important factor insofar as the invention is concerned is the incorporation of a transducer which will develop signals accurately representative of the instantaneous position of the movable member, which signal can be operated upon and otherwise utilized with the combination arranged in accordance with the present invention.

Now, assuming that a synchro 2 such as described above is provided as part of the system, then, as indicated, the rotor thereof would be mechanically connected by any suitable means such as the gear train 3 to the movable member 1. A three-phase generator 5 would feed the starter winding of the synchro 2 through suitable leads $6a$–$6c$. The rotor winding of the synchro 2 would, similarly, be electrically connected with the input of a pulse shaping circuit 4.

The pulse shaping circuit 4, shown in detail in FIGURE 8, serves to deliver signals $i_2$ and $i_2'$ (FIGURE 1) which are in phase with one another but of opposite sides. While the phase of signals $i_2$ and $i_2'$ are in phase, this phase relationship depends upon the phase of the signal $i_1$. Accordingly, the phase of the signals $i_2$ and $i_2'$, which are pulses, in fact, depend on the angular position of the rotor of the synchro 2, and to this end, the movement ratio of the gear train 3 is so designed that the rotor of the synchro 2 makes an angular displacement of less than 180° for the maximum stroke or path of travel of the movable member 1.

The pulses $i_2$ and $i_2'$ constitute signals which correspond unequivocally to the position of the movable member 1. In fact, the shaping circuit 4 transforms the sinusoidal signals $i_1$ delivered by the synchro 2 to a series of pulses $i_2$ and $i_2'$ at the rate of one pulse per cycle of the signal $i_1$. In the embodiment shown in FIGURE 1, the phase of the pulses $i_2$ and $i_2'$ is necessarily an exact function of the position of the movable member due to such arrangement.

The indicating device I further includes a delay circuit 7, which operates to delay the pulses $i_2$. This delay circuit 7 comprises a first monostable multivibrator stage with an adjustable time constant (FIGURE 6B) followed by an invertor circuit (FIGURE 6A) and by a second monostable multivibrator (FIGURE 6). Due to the variable resistance R of the monostable multivibrator, the time constant of this stage can be adjusted. Accordingly, the second front of the pulse $i_2$ can be adjustably delayed. The delay circuit 7 accordingly delivers a series of pulses $i_3$ out of phase with respect to the series of pulses $i_2$.

The counter II comprises a magnetic memory means including a rotary drum 8 driven by means of a motor 9. This drum is mechanically coupled to the rotor of the three phase generator 5 of the transducer I so that this generator 5 is driven synchronously with the drum 8. In the example shown, the rotary drum 8 has two recording tracks. The first recording track 10 is intended to record, in the form of a magnetic spot, an origin or reference position corresponding to the start or reference position of the movable member. The second recording magnetic track 11 is intended to record, in the form of magnetic spots, located on the periphery of the drum 8, operating positions of the movable member 1 distributed, for example, uniformly, between its reference position and its extreme end stroke position. All these magnetic spots constitute an electronic analogue graduation corresponding to a mechanical graduation, such as, for example, a standard ruler. It is along this graduation path that the movable member 1 is displaced. In the example shown in FIGURE 1, the electronic graduation comprises ten magnetic spots distributed over the recording track 11 and corresponding to ten positions of the movable member 1 uniformly distributed between its reference position and its end stroke position, the reference position being part of said electronic graduation.

This magnetic memory means further comprises two recording heads 12, 13 disposed adjacent and in front of the recording tracks 10, 11 respectively. These recording heads 12, 13 feed by electrical connections to the pulse shaping circuit 4 of the indicating device I through a selector switch which enables an operator to select one or the other of the recording heads 12, 13. Further, a normally open push button switch 15 is in the feed path. The recording heads 12, 13 may thus be alternatively fed by the signal $i_2'$ delivered from the transducer I.

This magnetic memory means further includes two reading heads 16, 17 disposed adjacent the recording tracks 10, 11 respectively. These reading heads 16, 17 feed through selector switches 18, 19 respectively, either to an eraser device 20 or to a corresponding reading amplifier 21, 22.

The reading head 16 reads the reference pulse recorded on the track 10 and delivers an electrical signal $i_r$ constituted by one pulse for each revolution of the drum 8. The reading head 17 reads the electronic graduation recorded on the track 11 and delivers an electrical signal $i_g$ constituted by a pulse train for each revolution of the drum 8 comprising a number of pulses equal to the number of positions of the movable member recorded on the track 11.

The counter means II, and in particular counter 23, receives from a control circuit 24 (FIGURE 5), an output controlled by the output signals $I_r$, $I_g$ from the reading amplifiers 21, 22.

The control circuit 24 (FIGURE 5) comprises an electronic selector switch 25 constituted by a bistable multivibrator placed in an initial state by means of a switch 26 and thereafter controlled by the output signal $I_r$ of the reading amplifier 21. This control circuit 24 has an input stage 27 fed by the output pulses $I_g$ of the reading amplifier 22. This input stage shapes the pulses $I_g$ and delivers a signal $I_g'$. The electronic selector switch 25 controls a gate circuit 28, which in its open state, feeds the pulses $I_g'$ delivered by the input stage 27 onto the counter 23 through the output stage 29 suitably matching the output impedance of the gate circuit 28 to the input impedance of the counter 23.

In this first embodiment under consideration, the counter 23 comprises only one decade since the electronic graduation as recorded on track 11 corresponds to ten positions of the movable member 1. This counter 23 is shown in detail in FIGURE 3 and essentially takes the form of a ring counter comprising ten units $30_{(0, 1 \ldots 9)}$ connected in cascade and forming a ring (i.e., the tenth unit is electrically connected to the first one). Each stage $30_{(0, 1 \ldots 9)}$ of this counter 23 comprises a first output $C_{(0, 1 \ldots 9)}$ intended to control the movable member 1 and a second output $A_{(0, 1 \ldots 9)}$ intended to control the display of the position reached by the movable member 1. Switch 31 is incorporated so that the counter 23 can be set to "zero" by imposing the state of its first unit $30_0$.

In the described embodiment the switches 26 and 31 are mechanically connected one to the other and can thus be closed only simultaneously.

Each of the outputs $C_{(0, 1 \ldots 9)}$ or $A_{(0, 1 \ldots 9)}$ of the counter delivers a signal $i_{c(0, 1 \ldots 9)}$ or $i_{a(0, 1 \ldots 9)}$ respectively, constituted by the pulse bearing the corresponding order number $_{(0, 1 \ldots 9)}$ of the pulse train $I_g'$. For each revolution of the drum 8 of the memory one pulse appears thus on each of the outputs $C_{(0, 1 \ldots 9)}$ and $A_{(0, 1 \ldots 9)}$ of the counter 23. Each output $C_{(0, 1 \ldots 9)}$ and $A_{(0, 1 \ldots 9)}$ of the counter 23 corresponds to a given magnetic spot of the electronic graduation recorded on track 11 and thus to a determined position of the movable member.

The control selector IV comprises in this first embodiment a selector 32 manually or automatically controlled in any desired conventional manner, to selection of one of the outputs $C_{(0, 1 \ldots 9)}$ of the counter 23, namely, the one corresponding to the desired stop position of the movable member 1, and to send the selected signal $i_{c(0, 1 \ldots 9)}$ onto an output stage 33 (FIGURE 4). The output stage 33 is preferably a monostable multivibrator of conventional design. (See, "Transistor Circuit Design," J. A. Walston; and J. R. Muller, Texas Instruments, Inc.; McGraw-Hill editor, 1963, pp. 380–381 ("Monostable Multivibrator")).

The monostable multivibrator of output stage 33 is controlled by the selected signal $i_{c(0, 1 \ldots 9)}$ and delivers a signal $i'_{c(0, 1 \ldots 9)}$ having pulses of predetermined amplitude and width. This amplitude and this width of these pulses are identical to the amplitude and the width of the pulses of the signal $i_3$ delivered by the delay circuit 7 of the transducer I so that the signals $i_3$ and $i'_{c(0, 1 \ldots 9)}$ are suitable for easy comparison.

Furthermore, the delay circuit 7 is adjusted to delay or lag the signal $i_2$ by an amount equal to the delay or lag introduced by the chain of elements constituted by the reading amplifier 22, the control circuit 24, the counter 23 and the output circuit 33. In this way, the signal $i'_{c(0, 1 \ldots 9)}$ delivered by the control selector IV is identical in shape and amplitude to the signal $i_3$ delivered by the transducer I when the movable member 1 is in its desired stop position. The signal $i_3$ is, however, of opposite sign to the one of the selected signal $i'_{c(0, 1 \ldots 9)}$, and signal $i'_{c(0, 1 \ldots 9)}$ is of 180° out of phase with respect to the signal $i_3$. The magnetic memory means introduces a phase shift of 180° between the recorded signal and the signal as read. This phase shift of 180° can thus be found again in the signal $i'_{c(0, 1 \ldots 9)}$.

The comparator V is fed by the signal $i_3$ delivered by the transducer I corresponding to the actual position of the movable member 1 and by the signal $i'_{c(0, 1 \ldots 9)}$ delivered by the control selector IV corresponding to the desired stop position of the movable member 1. Comparator V compares these signals $i_3$ and $i'_{c(0, 1 \ldots 9)}$ and delivers at its output an error signal $i_e$ corresponding to the interval between these two signals, and thus to the interval existing between the actual position of the movable member 1 and its desired stop position. When there is identity between the actual position of the movable member 1 and its controlled stop position, the signals $i_3$ and $i'_{c(0, 1 \ldots 9)}$ are identical but shifted exactly to 180° out of phase.

In the embodiment described, the comparator V comprises a phase comparison means 34 delivering an error signal $i_e$ corresponding to the phase interval between the signals $i_3$ and $i'_{c(0, 1 \ldots 9)}$. This phase comparison means 34 preferably is of the type including a stable multivibrator producing a square wave output followed by a filter circuit delivering the D.C. component resulting from the square wave signal delivered by the said multivibrator. This component may, if amplification is desired, be modulated by a chopper (see "Digital Method in Measurements and Control" by M. H. Notham, "Electrical Manufacturing," September 1959, page 131, Figure 8b). The error signal $i_e$ is constituted by a series of rectangular pulses forming a square wave. The rectangular pulses of this error signal $i_e$ are identical when the position of the movable member 1 corresponds to the controlled stop position, that is to say, when the signals of opposite signs $i_3$ and $i'_{c(0, 1 \ldots 9)}$ are shifted to exactly 180° out of phase.

The actuator VI for the movable member 1 comprises a control device 35 fed through an interrupter E with the error signal $i_e$ and controlling an electric motor 36 driving the movable member 1 in its displacements in a known manner.

The control device 35 includes a servo-amplifier of known type such as disclosed for example in "Control Engineering's Handbook" by J. Truxall, McGraw-Hill editor 1958; "AC-Servos" chap. 6, p. 45; in "Servomechanism Practice" by W. R. Ahrendt, McGraw-Hill editor 1954, p. 99; or in "Transistor Circuit Design" by J. A. Walston, S. R. Muller, Texas Instruments Inc., McGraw-Hill editor 1963, "Servo-Amplifier," p. 238.

The operation of the control loop described hereinbefore comprising the transducer I, the counter II, the control selector IV, the comparator V and the actuator VI is as follows:

Assume first that the movable member 1 is in its original or start position and that the magnetic memory is empty, that is to say, that the tracks 10, 11 are free of recordings. Assume also that the selector switches 18, 19 are positioned as illustrated in FIGURE 1 (i.e., the reading heads 16, 17 are connected to the reading amplifiers 21, 22). Assume finally that the interrupter E is open, thus disconnecting the actuator VI.

When the machine is in this state, the first operation to be performed is that of recording the reference position and the electronic graduation in the magnetic memory. Therefore, the operator starts the motor 9 driving the drum 8 of the magnetic memory as well as the generator 5 feeding the stator windings of the synchro 2. From then on, the rotor of the synchro 2, the angular position of which is determined by the position of the movable member 1, is the source of a current $i_1$, the phase of which depends on said angular position of the rotor. This current is transformed in pulses of short width at the rate of one pulse per cycle by means of the pulse shaping circuit 4 which delivers a signal $i_2'$ formed by a series of pulses, the phase of which pulses corresponds exactly to the actual position of the movable member 1. With the movable member 1 in its reference or start position, the operator sets the selector switch 14 in the position shown in FIGURE 1 (i.e., in a position such that the recording head 12 can be connected to the pulse shaping circuit 4.) Then the operator depresses shortly the press button switch 15, thus feeding the recording head 12 with the signal $i_2'$ corresponding to the reference position of the movable member 1. This origin or reference position is recorded on the track 10 of the rotative drum 8 in the form of a magnetic spot. More specifically, since the rotation of the drum 8 and of the generator 5 is rigorously in synchronism, the drum effects exactly one complete revolution between two successive pulses of the signal $i_2'$, so that these pulses are recorded as only one magnetic spot on the track 10. The angular position of this spot corresponds to the reference position of the movable member 1.

Having recorded the "reference position spot," the operator then actuates the selector switch 14 to connect the recording head 13 to the pulse shaping circuit 4. A short depression of the push button switch 15 feeds the recording head 13 with the signal $i_2'$ and results in the recording of the reference position of the movable member on the track 11 of the rotary drum 8, in a similar way as above described with reference to the recording of said position on the track 10 of the drum 8.

The operator then manually moves the movable member 1 along a distance equal to one-tenth of its complete stroke, or to the first operating position thereof following the start. (The electronic graduation comprises ten magnetic spots in this embodiment.) Then, the operator records this first position of the movable member on the track 11 of the drum 8 by briefly depressing the push button switch 15. This first position of the movable member is recorded on the magnetic drum 8 in the form of a magnetic spot displaced with respect to the magnetic spot representing the reference position of the movable member 1.

The operator then successively and in the same manner, records second, third, etc., positions, until the ninth position is recorded. The successive positions are spaced apart, one from the other, by a distance equal to one-tenth of the total stroke of the movable member 1. Once all of these positions of the movable member are recorded, the track 11 of the magnetic memory presents ten magnetic spots located on the periphery of the drum 8, each of these magnetic spots corresponding to one of the positions of the movable member 1. All these magnetic spots constitute the electronic graduation.

After recording the graduation, now consisting of spots representing a reference and nine other positions, the operator places the selector switch 32 on the output of the counter 23 corresponding to the position in which he desires the movable member 1 to be automatically brought, then he actuates simultaneously the interrupters 26 and 31 so as to place the multivibrator of the electronic selector switch 25 of the control circuit 24 in its initial state. In this state, the electronic selector switch shuts the gate 28 and sets the counter 23 to zero.

The actuator VI of the movable member, which was disconnected from the control circuitry during the recording of the electronic graduation is then reconnected to such circuitry by closing switch E. The machine is then ready to work. Alternatively, switch E could be controlled simultaneously with the switches 26 and 31, so that switch E closes when switches 26 and 31 open.

Having closed switch E, reading heads 16, 17 deliver electrical signals $i_r$ and $i_g$ respectively corresponding to the recorded magnetic spots. As the reading heads 16, 17 are located diametrically opposite the recording heads 12, 13 with respect to the drum 8, the signals $i_r$ and $i_g$ delivered by the reading heads are shifted 180° out of phase with respect to the signal $i_2'$ having been used for the recording of the said magnetic spot.

As long as the gate circuit 28 is shut, the pulses $I_g$ formed by the reading amplifier 22 from the pulses $i_g$ delivered by the reading head 17 upon reading the electronic graduation, are not delivered to the counter 23.

The arrival of a pulse $I_r$ corresponding to the reference position and formed by the reading amplifier 21 from a pulse $i_r$ coming from the reading head 16, on the input of the electronic selector switch 25 causes the opening of the gate circuits 28 and thus feeding of the counter 23 with the pulses $I_g'$ resulting from the reading of the electronic graduation.

The counter 23 having been reset to zero, i.e., set with the first stage in a conducting state, the first pulse coming into the counter is a pulse corresponding to the first position of the movable member 1 after its reference position. This pulse results in blocking of the first stage of the counter, and conduction of the second stage of the counter. This first pulse is thus delivered on the outputs $C_1$ and $A_1$ of the counter. Then, upon the arrival into the counter of the next pulse $I_g'$, such next pulse is directed to the outputs $C_2$ and $A_2$ of this counter, etc. The successive pulses of one pulse train $I_g'$ corresponding to one complete revolution of the drum 8 of the magnetic memory are distributed on the ten outputs $C_{(0,1 \ldots 9)}$ and $A_{(0,1 \ldots 9)}$ of the counter. Then during the next revolution of the drum 8, a second pulse train $I_g'$ is emitted and its pulses are distributed on the outputs $C_{(0,1 \ldots 9)}$ and $A_{(0,1 \ldots 9)}$ of the counter corresponding to the order number of each of these pulses in the successive pulse train $I_g'$.

One obtains on each output $C_{(0,1 \ldots 9)}$ and $A_{(0,1 \ldots 9)}$ of the counter 23 signals $i_{c(0,1 \ldots 9)}$ and $i_{a(0,1 \ldots 9)}$ respectively each constituted by a series of pulses corresponding to the reading of one of the ten magnetic spots recorded on the drum 8. The signals of two successive outputs of the counter 23, correspond thus to the repetitive reading of two successive magnetic spots of the magnetic memory, but are phase-shifted one with respect to the other, by a value corresponding to the interval between two successive positions of the movable member 1.

However, only the signal $i_{c(0,1 \ldots 9)}$ selected by means of the selector switch 32 and shaped through the output stage 33, which delivers a corresponding signal $i'_{c(0,1 \ldots 9)}$, feeds the phase comparator 34 so that only this one selected signal is compared with the signal $i_3$ corresponding to the actual position of the movable member 1.

If the movable member 1 is not in its desired stop position, determined by the selected signal $i'_{c(0,1 \ldots 9)}$, an error signal $i_e$ is delivered by the comparator 34. This error signal $i_e$ controls the actuator VI of the movable member to bring it into, and then maintain it in, the desired stop position when the error signal $i_e$ is equal to zero (i.e., when the rectangular pulses of said error signal are regular, or equal in width).

In this first embodiment schematically illustrated in FIGURE 1, the electronic control system provided hereby also includes a display device III as well as a survey device VII.

The display device III is essentially a read-out means for the desired stop position for the movable member 1. It includes a selector switch 37 mechanically connected to the selector switch 32 of the selection device IV, which selector switch feeds one of the ten lamps 38 indicating which of the outputs $C_{(0,1\ldots9)}$ of the counter 23 has been selected, and thus the desired stop position of the movable member.

This display device III further gives a record of the actual position of the movable member 1. To this end, a group of pulses shaping circuits 39 and two groups of "AND" circuits 40, 41 are connected in cascade with a group of display elements 42.

Figure 2A:
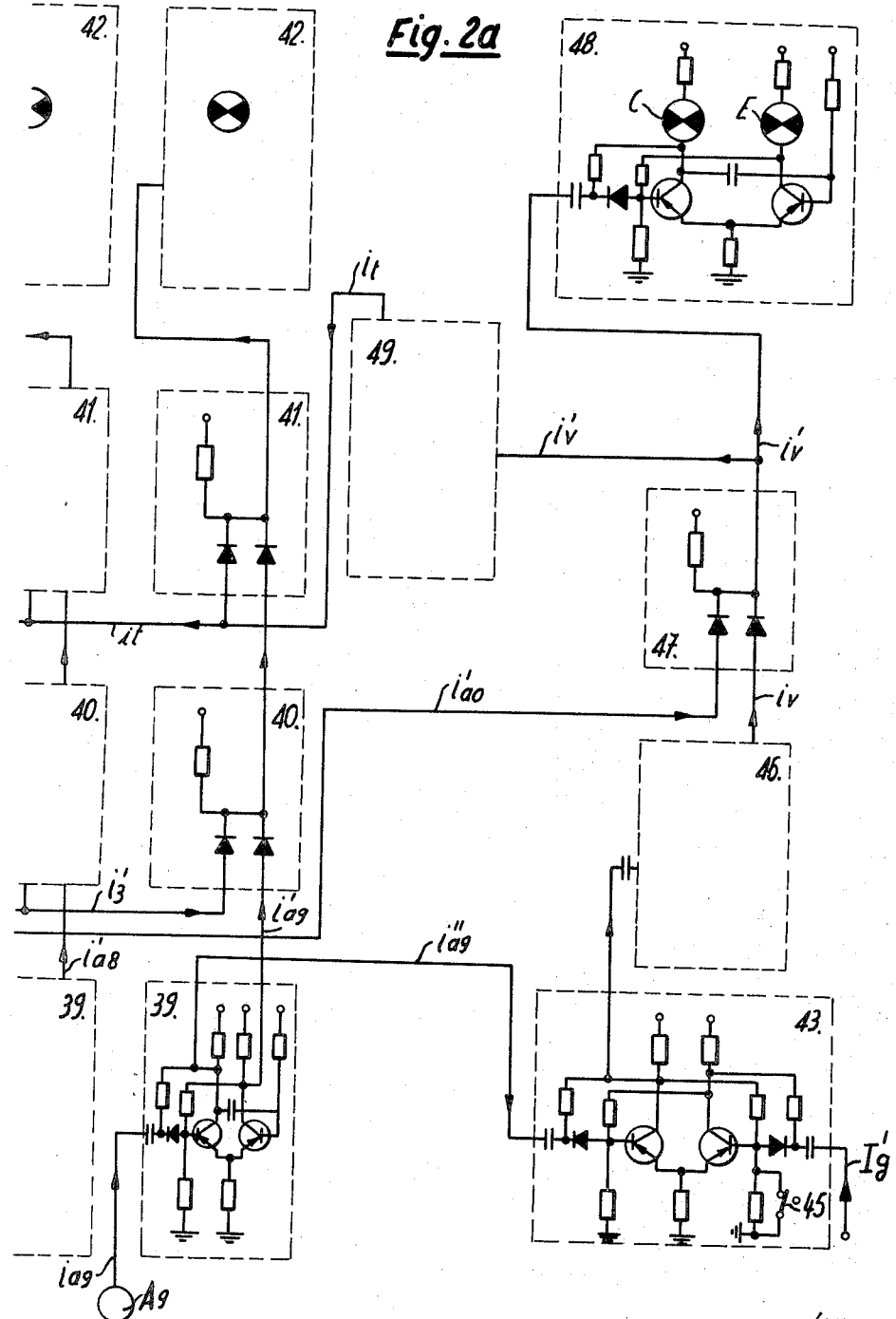
Figure 9:
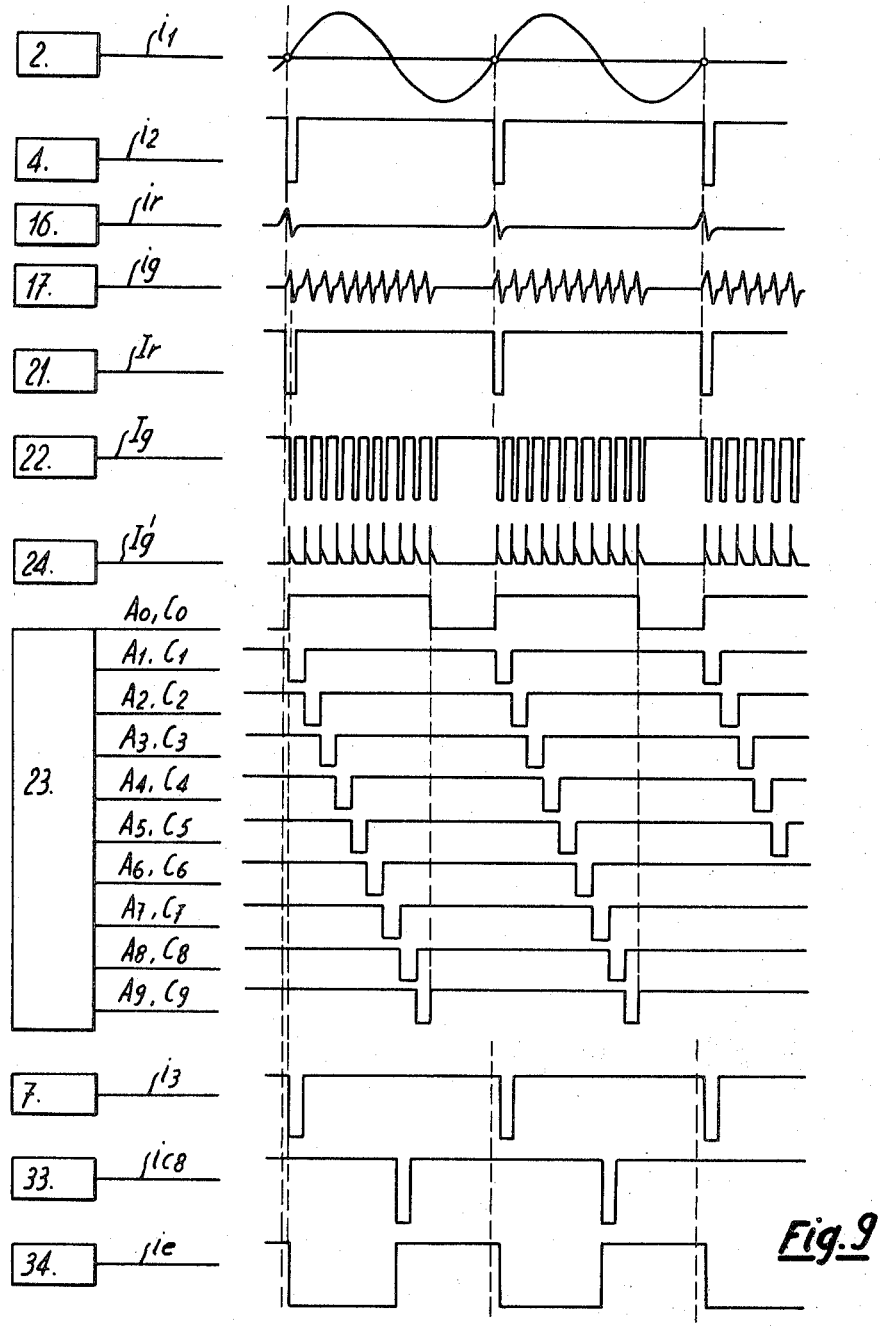
FIGURES 9 and 10 are schematic representations of the shape of signals at different reference points of the control system of FIGURE 1.
Figure 10:
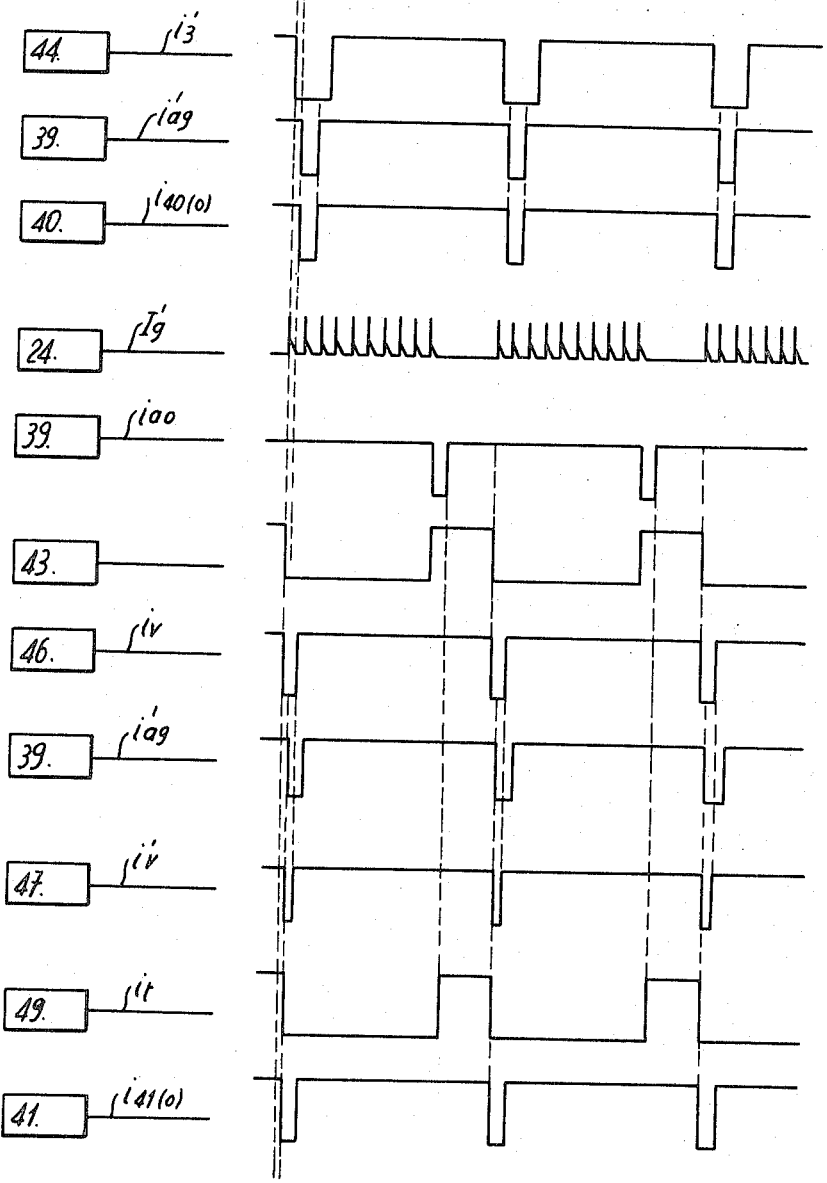

Visual display of the actual position is obtained by the arrangement illustrated in detail in FIGURES 2 and 2A. Each output $A_{(0,1\ldots9)}$ of the counter 23 is electrically connected to the input of one pulse shaping circuit 39, each pulse shaping circuit is a monostable multivibrator. The series of pulses $i_{a(0,1\ldots9)}$ feed their corresponding monostable multivibrators, which in turn forms a series of pulses $i'_{a(0,1\ldots9)}$ of determined amplitude and width. The width of the pulses $i_{a(0,1\ldots9)}$ is important since it determines the sensibility of the display.

Each of the signals $i'_{a(0,1\ldots9)}$ feeds one of the inputs of the "AND" circuits 40. The other inputs of the "AND" circuits are fed by a signal $i_3'$, formed from the signal $i_3$ delivered by the transducer I. To obtain a coherent display, the signal $i_3'$ has to be in phase with the corresponding signal $i'_{a(0,1\ldots9)}$ and its pulses have to be slightly wider. To obtain the signal $i_3'$, the signal $i_3$ is shifted out of phase and shaped in a circuit 44. This circuit 44 is like the one illustrated in FIGURES 6, 6A, 6B. The signal $i_3$ enters in a monostable multivibrator (FIGURE 6B), where the back front is shifted out of phase by the desired value (180°) by means of the resistance R. The signal is then inverted by means of the inverter stage (FIGURE 6A) and finally shaped by means of the monostable multivibrator (FIGURE 6). This multivibrator (FIGURE 6) is adjusted in such a way that the pulses of the signal $i_3'$ are slightly longer than the ones of the signals $i'_{a(0,1\ldots9)}$. Since all the signals $i'_{a(0,1\ldots9)}$ are shifted out of phase, one with respect to the other, only one of them is able to be at a given instant in phase with the signal $i_3'$ corresponding to the actual position of the movable member 1. Therefore, only one of the "AND" circuits 40 has its two inputs fed in phase, and only such "AND" circuit delivers an output signal. In fact, only the "AND" circuit corresponding to the output $A_{(0,1\ldots9)}$ of the counter 23 and corresponding also to the actual position of the movable member is fed with two in phase signals. As indicated, the width of the pulses $i_3'$ is slightly greater than that of the pulses $i'_{a(0,1\ldots9)}$ so that the "AND" circuit producing an output delivers a signal even if the movable member 1 is slightly displaced to the left or to the right of its exact position which corresponds to the output $A_{(0,1\ldots9)}$ of the counter 23.

Each "AND" circuit 40 could be directly used to control a corresponding lamp. However, the pulses delivered to said lamp would have a duration of some tenth of a microsecond and a frequency of 50 c.p.s., so that during relatively great time intervals, no display could be shown and while possible, direct feeding of lamps is somewhat undesirable. Accordingly, these "AND" circuits 40 preferably control display circuits 42 or specifically, monostable multivibrators which delay the second front of pulses received from the "AND" circuits, and deliver pulses of long width that feed to lamps or any other suitable indicating means during a sufficient time that the display by the lamps or other means appears continuous to the human eye.

In the illustrated system, the signal delivered by the "AND" circuit 40 is set in coincidence by means of the "AND" circuit 41, with a signal $i_t$ delivered by the survey device VII of the counter II. This survey or safety signal $i_t$ is present only when the counter works satisfactorily. Specifically, "AND" circuit 41 has an output signal only if the signal $i_3'$ is in phase with the corresponding signal $i'_{a(0,1\ldots9)}$ (function of "AND" circuit 40) and if the counter 23 works correctly (function of "AND" circuit 41). Each "AND" circuit 41 controls a display circuit 42.

For the clarity of the drawing, the pulse shaping circuits 39, the "AND" circuits 40 and 41, as well as the display circuits 42 relative to the ten outputs of the counter 23, have been grouped in one block.

The survey device or safety check VII of the counter II comprises an electronic switch 43 formed by a bistable multivibrator receiving the signal $I_g'$ obtained from reading the electronic graduation on track 11 of drum 8. This bistable multivibrator is set into its initial state by means of the signal $i_{a9}''$ delivered by the last stage of the counter 23 after such signal has been shaped through the corresponding multivibrator 39. Electronic switch 43 is coupled to ground through switch 45 actuated simultaneously with the switches 26 and 31, and switch 45 serves to place electronic switch 43 in its initial state.

The pulse delivered by the electronic switch 43 is shaped in a pulse shaping circuit 46, also formed by a monostable multivibrator (FIGURE 6), which delivers a pulse of short or narrow width which is in phase with the first pulse of the electronic graduation. In fact, the bistable multivibrator 43 is placed in its initial condition only through the signal delivered by the last output of the counter, corresponding to the last pulse shaping circuit 46, set to be of a width less than the interval comprised between two successive pulses of the electronic graduation, is fed with the pulse $i_{a0}'$ delivered by the first output of the counter 23 after pulse $i_{a0}'$ has been shaped in the multivibrator 39 to an "AND" circuit 47. If these two pulses $i_v$ and $i_{a0}'$ are in phase, then counter 23 is working correctly, the "AND" circuit 47 delivers a pulse $i_v'$ which controls a display monostable multivibrator 48, the time constant of which corresponds to the duration of one pulse train $I_g'$. In this way, the pulses $i_v'$ maintain said display monostable multivibrator 48 in its unstable state causing the energization of lamp C (FIGURE 2A) indicating the correct working of the counter II. Essentially, the signal from the record (drum 8) is compared with the signal from the counter 23 to determine proper counter operation. If the counter 23 is not functioning correctly, $i_v'$ is not present and the display monostable multivibrator 48 falls into its stable state, causing the lamp C to cutoff, and energization of lamp E (FIGURE 2A) indicating an error of working of the sequential counting device II.

Further, the signal $i_v'$ is fed to a pulse shaping circuit 49, again formed by a monostable multivibrator, which delivers a pulse $i_t$ for each pulse $i_v'$. This circuit 49 is adjusted in such a way that the width of the pulses $i_t$ is equal to the duration of one pulse train $I_g'$. As previously described, the absence of this signal $i_t$, corresponding to improper operation of the counter 23, causes the suppression of the display of the actual position of the movable member. The signal $i_t$ as fed past one of tthe "AND" circuits 41 has to be in coincidence with a signal delivered by one of the "AND" circuits 40 before one of the display elements 42 is actuated.

Alternatively, the described control device can further include a security device shown in block form. This security device comprises a monostable multivibrator 50 controlled by the signal $i_v'$ which is delivered by the "AND" circuit 47 of the safety check VII. This monostable multivibrator 50 is adjusted so as to deliver a signal $i_v''$ presenting the shape of a square wave. A filter 51 fed by the signal $i_v''$ delivers the D.C. component $i_m$ of this square wave. This D.C. component $i_m$ is used to control a Schmitt Trigger 52 actuating a relay 53 which controls the stopping of the motor or actuator.

When the counter II works normally, the filter 51 delivers a signal $i_m$ which, through the Schmitt Trigger 52, maintains the relay 53 in closed position connecting motor 36 of the actuator for the movable member 1 in circuit to receive drive current. If, on the other hand, the sequential counting device does not work correctly, the "AND" circuit 47 delivers no signal $i_v'$. Without signal $i_v'$, the signal $i_m$ delivered by the filter 51 is equal to zero, thus resulting in a change of state of the Schmitt Trigger 52 and in the opening of relay 53, and in turn, stopping of the motor 36. In this way, if the sequential counter II does not work satisfactorily, the operator is warned not only by the display circuit 48, and the absence of display of the actual position of the movable member, but additionally, the movable member is immediately stopped. This eliminates accidents due to improper positioning of the movable member 1.

Figure 11:
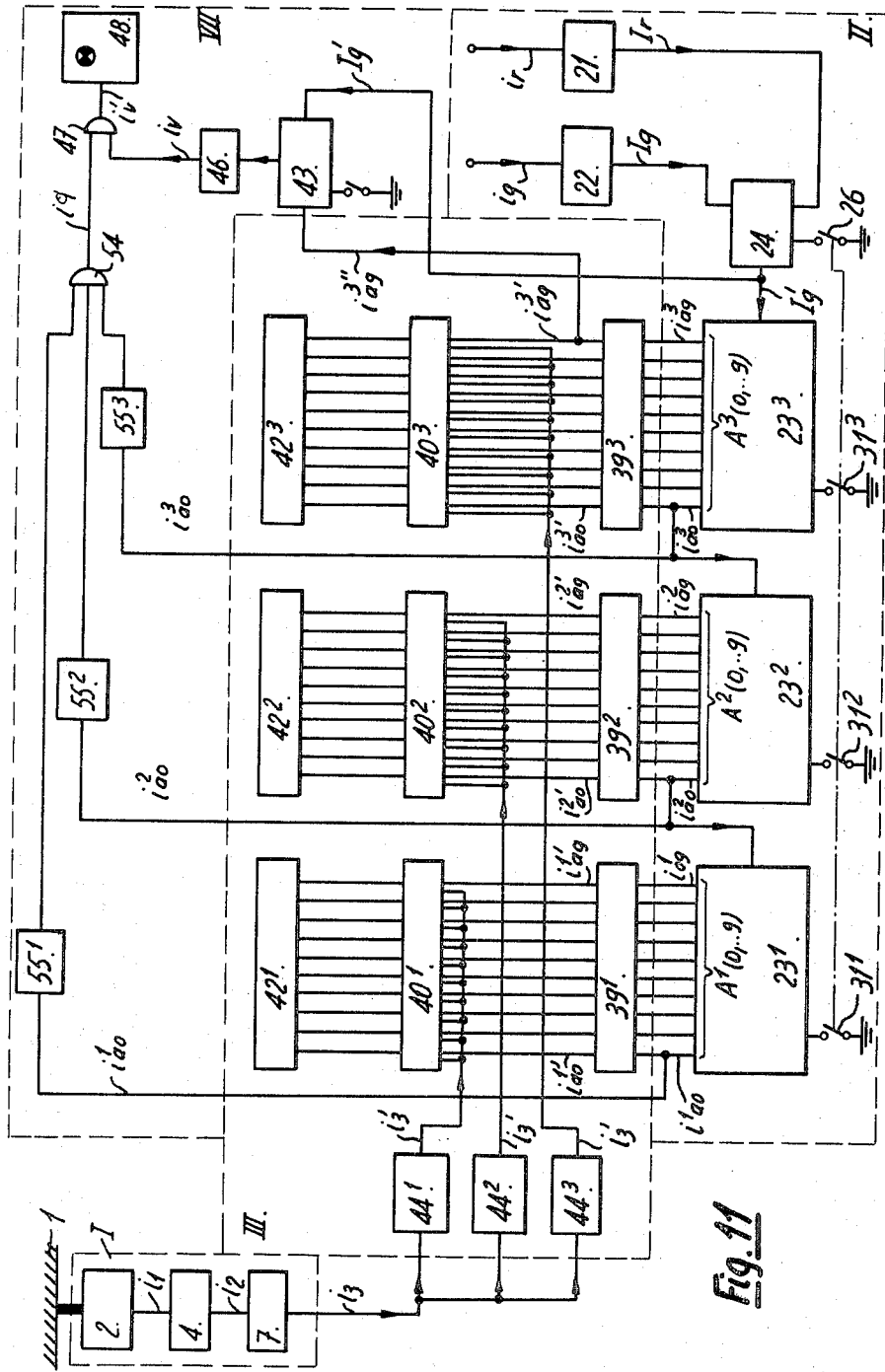
FIGURE 11 is a schematic block diagram of a display device presenting the actual or instantaneous position of a movable member being controlled by a system constructed in accordance herewith but comprising three "decades" as opposed to a single decade as shown in FIGURE 1.

In order to increase the precision of the positioning of the movable member, the number of positions of the movable member recorded in the magnetic memory of the sequential counter II could be increased. In fact, it is quite easy to record a thousand positions of the movable member 1 on a same track of the rotative drum 8. This is achieved in the modification of the control system partially shown in FIGURE 11. FIGURE 11 shows partially the transducer I and counter II as well as the read-out III.

In this modified embodiment, the signal $i_g$ which corresponds to the signal read from the stored electronic graduation recorded in the magnetic memory (not shown in FIGURE 11) comprises pulse trains each having a thousand pulses corresponding to a thousand positions of the movable member 1.

As in the embodiment shown in FIGURE 1, the signals $i_g$ and $i_r$ obtained by the reading of the information recorded in the magnetic memory are amplified and delivered to the control circuit 24 of the counter 23. However, here the counter 23 comprises three decades $23^1$, $23^2$, and $23^3$, corresponding respectively to the hundreds, tens, and units decimal numerals. Each of the decades $23^1$, $23^2$ and $23^3$ is identical to the counter 23 shown in FIGURE 1. The decade $23^3$ is fed by the signal $I_g'$ delivered by the control circuit 24 and constituted by successive pulse trains of a thousand pulses each. This decade $23^3$ distributes the pulses of the signal $I_g'$ on each of its outputs $A^3_{(0, 1 \ldots 9)}$. The signal delivered by the output $A_0^3$ of this decade $23^3$ for the counting of the units, feeds the decade $23^2$ for the counting of tenths. For each pulse train of the signal $I_g'$ the signal delivered by the output $A_0^3$ comprises a hundred pulses. These hundred pulses are distributed by the decade $23^2$ counting the tenths on each of its outputs $A^2_{(0, 1 \ldots 9)}$. The output $A_0^2$ of this decade $23^2$ feeds the decade $23^1$ for counting the hundredths by means of ten pulses for each pulse train $I_g'$ corresponding to the reading of the thousands pulses of the electronic graduation. The decade $23^1$ distributes these ten pulses on each of its outputs $A^1_{(0, 1 \ldots 9)}$. The counter 23, in this embodiment, thus comprises three decades counted in series, and by virtue of the thirty outputs $A^1_{(0, 1 \ldots 9)}$, $A^2_{(0, 1 \ldots 9)}$, and $A^3_{(0, 1 \ldots 9)}$, identification is given each of the thousand pulses of each pulse train $I_g'$ derived from the recorded electronic graduation. In this case, and in a general way when the counter 23 comprises more than one decade, "one output of the counter 23" means an output including the combination of one independent output of each decade of the counter. Specifically, in the embodiment of FIGURE 11, one output of the counter 23 is made up by the combination of one output from each of the decades $23^1$, $23^2$, and $23^3$, i.e., it is a collective output. The control selector IV here (not shown) comprises selector switches $32^1$, $32^2$, $32^3$ connected to each of the decades of the counter 23 respectively. The three selected control signals coming each from one decade form the control signal corresponding to the desired position of the movable member 1.

With the arrangement of FIGURE 11, the read-out III comprises a display of the reached position of the movable member 1 similar to the one described in reference to FIGURE 1, for each of the decades $23^1$, $23^2$ and $23^3$ of the counter. In fact this display comprises groups of pulse forming circuits $39^1$, $39^2$, and $39^3$ feeding groups of "AND" circuits $40^1$, $40^2$, and $40^3$. These "AND" circuits $40^1$, $40^2$ and $40^3$ are also fed by signals $i_3'$ corresponding to the signal $i_3$ delivered by the indicating device I but shaped by means of phase shifting circuits (phase shift of 180°) and pulse shaping circuits $44^1$, $44^2$ and $44^3$ respectively. These "AND" circuits $40^1$, $40^2$ and $40^3$ control the corresponding display circuits $42^1$, $42^2$ and $42^3$, being operative to present a display when the associated "AND" circuit receives two in-phase signals.

The survey device or safety check VII of the counter II is similar to the one described with reference to FIGURE 1. It gives a check on the arrival of the first pulse of each pulse train of a thousand pulses $I_g'$ (i.e., it checks on the feed of the three outputs $A_0^1$, $A_0^2$ and $A_0^3$ and insures the counter has been reset to zero).

This safety check VII comprises, as the one described with reference to FIGURE 1, an electronic switch 43 fed by the signal $I_g'$ and controlled by the output $A_0^3$ of the counter. The signal delivered by the electronic switch, formed by the first pulse of each train of ten pulses $I_g'$, is shaped in a circuit 46 like the pulse shaping circuits 39, and delivers a signal $i_v$ to one of the inputs of the "AND" circuit 47. The other input of the "AND" circuit 47 is a signal $i_q$ derived from the coincidence realized by the "AND" circuit 54 of the signals delivered by the outputs $A_0^1$, $A_0^2$ and $A_0^3$ of the counter after having been shaped by the monostable multivibrators $55^1$, $55^2$ and $55^3$. The "AND" circuit 54 delivers a signal $i_q$ only when its three inputs (coming from $55^1$, $55^2$ and $55^3$) are in phase, that is to say for each thousandth pulse $I_g'$ coming in the counter 23. This is however realized only when the three decades $23^1$, $23^2$ and $23^3$ work correctly.

The signal $i_q$ thus represents a survey or safety check on counter 23. This check, however, may not be sufficient since parasitic pulses could influence the decades of the counter 23 (for example by advancing all the outputs of the decade $23^3$ of one unit). To obtain a complete control, each thousandth pulse $I_g'$ coming in the counter 23 is compared with a signal $i_q$. This second control is effected by means of an "AND" circuit 47. In the example shown, the signal $i_v$ comprises a series of pulses corresponding to each tenth pulse $I_g'$. Therefore, the signal $i_v$ comprises a hundred pulses for each reading of one complete electronic graduation comprising a thousand pulses. Only the first of these hundred pulses $i_v$ is in phase with the signal $i_q$ if the counter works normally. The coincidence of this pulse $i_v$ and of the signal $i_q$ delivers a signal $i_v'$.

Alternatively, the signal setting the multivibrator 43 into its initial state could not be formed by the signal $i_{a9}3'$ but by the coincidence of the signals $i_{a9}3'$, $i_{a9}2'$ and $i_{a9}1'$. In this case, the signal $i_v$ comprises only one pulse for a thousand pulses $I_g'$. With normal working of the counter, each pulse $i_v$ is in coincidence with a pulse $i_q$ thus generating a signal $i_v'$. The signal $i_v'$ controls, as described with reference to FIGURE 1, a display monostable multivibrator 48, regardless of how signal $i_v'$ is derived.

A further embodiment of the control system hereof, illustrated in FIGURES 12 and 13, is similar to the embodiment described and illustrated with respect to FIGURE 11, but operates with an electronic graduation having $10^n$ pulses—that is, $n$ decades. In the diagram of FIGURE 12, the read-out or display device III and the safety check or survey device VII of the counter II have been omitted merely to simplify the drawing and facilitate comprehension of the embodiment. The counter II is like the one shown in FIGURE 1, but instead, comprises a counter 23 having $n$ decades. In this embodiment, the control selector IV comprises a punched tape numeric control.

This control selector includes an information member in the form of a punched tape R, a pulse motor 75 for step by step driving of the tape, a reader 74 ("Friden" Commercial Controls Corp., Rochester, or "Creed" Creed and Co. Ltd., Croydon); a decoder 76 ("The Design of Switching Circuits" by W. Keisler; A. E. Ritchie, S. A. Washburn, Van Norland Co. edition. chapter 13 "Codes and Translating Circuits") for the information presented in coded form on the punched tape R, a pulse generator 77 electrically connected on one side to the pulse motor 75 through a switch 78 and on the other side to a decimal counter 79 through a gate circuit 80, as well as a distribution matrix 81 fed on the one hand by the decoder 76 and on the other hand by the decimal counter 79.

The pulse generator 77 is of a known type, described for example in "Transistor Circuit Design," by T. A. Walston, T. R. Muller, Texas Investment Inc., McGraw-Hill editor, 1963, "Digital Circuits," p. 377 in "Transistor Circuit Engineering" by R. F. Shea, T. Wheiley and Sons or Chapman and Hall editors 1958 "Pulse Oscillator," p. 260 McGraw-Hill editor, 1956, "Astable Multivibrator," p. 199. The pulse motor 75 is a D.C. step by step motor such as the ones manufactured by Superior Electric Co., U.S.A. under the name of "Slo-Syn" or by the firms Teller (U.S.A.) or Kuhne (Germany).

The pulse motor is fed by electric pulses delivered by the pulse generator 77 and drives, for each pulse received, the punched tape a predetermined distance corresponding to the distance separating two successive lines $G_{(1,2...n)}$ of perforations.

The pulse generator 77 delivers control signals to the motor 75 and to the decimal counter 79, such control signals taking the form of a series of pulses of determined frequency.

The punched tape R contains in addition to information necessary for the control of the machine (for example of the cutting speeds or of the working speeds, the identification of the desired tool, etc.) information corresponding to the desired stopping or operating positions of the movable member. The information relative to the desired stopping positions of the movable member 1 is provided by a group $G_{(1,2...n)}$ of perforations for each cipher. This punched tape R further carries information relative to the control of the gate circuit 80, the gate circuit 83 and of the decimal counter 79. The coding of the information contained in the tape R corresponds preferably to the EIA standards.

The gate circuit 80 is similar to the gate circuit 28 of the control circuit 24 of the counter illustrated in FIGURE 5.

The decimal counter 79 includes $n$ outputs, namely $a_{(1,2...n)}$. The first pulse received by the counter is delivered to the output $a_1$, the second to the output $a_2$ and so on. This counter can be formed as a ring counter comprising one or more decades, similar to the one illustrated in FIGURE 3. This counter 79 is able to be reset to zero by means of a signal $i_z$ derived from any desired information carried by the punched tape R.

The decoder 76 transforms each line of perforations of the tape R into electrical signals which appear on the output $b_{(0,1...9)}$ corresponding to the digit determined by the line of perforations undergoing examination or read-out.

The distribution matrix 81 comprises $n$ rows corresponding to he decades and ten lines associated with the digits 0 to 9. The intersections of the lines and rows of this matrix are constituted by "AND" circuit 82. All the "AND" circuits 82 belonging to the same row are fed in parallel through the output $a_{(1...n)}$ of the decimal counter 79 corresponding to one decade. All the "AND" circuits 82 belonging to a same line are fed in parallel by the output $b_{(0,1...9)}$ of the decoder 76 corresponding to a digit. Each of the "AND" circuits 82 delivers a signal only when it is fed simultaneously by the corresponding outputs of the decoder 76 and of the decimal counter 79.

This selecting device comprises further $(10 \times n)$ gate circuits 83 (such as the gate circuit shown in FIGURE 13) controlling the $(10 \times n)$ outputs of the counter 23 of the sequential counter II. Each of the ten gate circuits 83 corresponding to the first decade of the desired stop position is controlled by one of the "AND" circuits 82 of the first row of the matrix corresponding to the first decade. The "AND" circuits 82 of the other rows of the matrix 81 control in a similar way gate circuits 83 of the other decades of the counter 23.

The gate circuits 83 are also placed in their initial state, before reading of the information relative to the desired stop position, by means of the signal $i_z$ obtained from the reading of information carried by the punched tape.

The operation of this embodiment of the control device hereof is, for the indicating device I, the counter II, the comparator V and the actuator VI identical to the one of the first embodiment. Only the selection of the outputs of the counter 23 corresponding to the desired stop figure of the movable members 1 is different.

In the rest state of the selection device the switch 78 is open, the gate circuit 80 is blocked, the counter 79 is set to zero and all the gate circuits 83 are blocked. The operator then closes the switch 78 to feed the motor 75 from the pulse generator 77. The motor 75 then drives the punched tape R step-by-step to set the counter 79 to zero and block the gates 83. These operations may also be automatically accomplished and controlled by means of information carried on the punched tape. This is particularly the case during the automatic positioning of the movable member in several successive stop positions. Then one information bit from the tape R yields after reading and decoding, a signal $i_x$ which opens gate 80. From then on, each pulse delivered by the generator 77 causes, on the one hand, the advance of one step of the tape R, and on the other hand, the passage of the output signal of the counter 79 from one of its outputs onto the next.

In this way, the first line of perforations $G_1$ gives raise at the corresponding output $b_{(0,1...9)}$ of the decoder to a signal corresponding to the first digit since the output $a_1$ of the counter 79 is fed, the "AND" circuit 82 of the first row corresponding to the first decade, opens the corresponding gate circuit 83.

One after the other, the lines $G_{(2...n)}$ are decoded causing successively the opening of gate circuits 83 corresponding to the second, ... $n^{th}$ decade of the counter 23. The "AND" circuit 54 passes the signals $i_{c(1...n)}$ of the counter 23, as soon as a cipher has been selected on each decade, through the opening of a gate 83, and delivers the signal $i_c'$ corresponding to the desired position of the movable member 1. This signal $i_c'$ is then compared to the signal $i_3$ corresponding to the actual position of this movable member 1 in order to form an error signal $i_e$ which controls the actual displacements of this movable member. These operations are performed in essentially the same manner as corresponding operations described with reference to the first embodiment of the control system hereof, and accordingly, need not be repeated here.

When the last line of perforations $g_n$ corresponding to the $n^{th}$ decade of the stop digit of the movable member, is decoded, an information bit on the tape then driven into read-out position causes gate circuit 80 to close. However, the gate circuits 83 having been opened, remain open until the movable member stops in its exact desired position.

The control device hereinabove with reference to FIGURES 1 to 13, enable automatic positioning of a movable member 1 in the ten, a thousand, or $n$ positions previously recorded by simple numeric selection of the desired stop position, i.e., selection of a corresponding output of the counter 23. It has to be noted, however, that in such embodiments, the desired stop position is always identified with respect to a fixed reference position, which may be defined as the origin or start position of the movable member 1, for example. More specifically, the control selector has to be controlled in function of the absolute stopping figure desired, that is the setting figure with respect to the origin or start position of the movable member. In practice, this is sometimes unwanted since the user often desires to be able to control the selection device in function of the relative setting figure, that is to say, in function of the distance separating two successive machinings or two successive stop positions.

This may be done by means of the control device hereof. In fact, the movable member 1 is first brought into its first stop position as described above by controlling the control selector IV in terms of the distance separating the first stop position from the origin or start position. When the movable member 1 is in the first stop position, the operator can erase, by means of an eraser device 20, the reference pulse recorded on the track 10 of the rotative drum 8 and record a new reference pulse corresponding to the position of the movable member 1 at that time. To place the movable member 1 in its second stop position, the operator controls the control selector IV in terms of the distance separating the first stop position from the second stop position. It is evident that when the adjustment of the control selector is effected automatically, the erasure of the old reference position and the recording of the new one can also be effected automatically.

Notwithstanding the above, the use of a changing reference position would lead, in the case of the embodiments described before, to an incorrect indication by the display device of the position reached by the movable member. Specifically, the first pulse of each pulse train of the signal $I_g'$ no longer, in this instance, corresponds to the origin or start position of the movable member 1. To overcome this problem, one need merely use a display device of the type using a fixed reference indication.

In the case of machine tools having a movable member 1 displaceable along a distance equal or greater than one meter and wherein one desires to obtain a high degree of precision for the positioning, it is possible to record an electronic graduation comprising $10^4$ and $10^6$ pulses which corresponds to positions of the movable members separated one from the other by one-tenth of a millimeter or one micron for a total displacement equal to one meter. However, the recording of $10^6$ distinct magnetic spots on only one circular track would lead to an excessively large magnetic memory and would thus be undesirable from the economical and technical point of view.

Consequently, when high precision is required over substantial distance, a control device comprising two or more electronic graduations can easily be used with the system hereof.

The embodiment of the control system illustrated in FIGURES 14 and 15 comprises two electronic graduations and is intended to provide a control with either a fixed or changing reference position. In this embodiment comparator V and a safety check VII identical to the ones illustrated in FIGURE 1 are used. These devices, therefore, need not be described here, but for convenience, in FIGURES 14 and 15, corresponding elements have been shown with the same reference number. To simplify the understanding and the drawings, the display device has been omitted from the drawings of this embodiment, but it is like the others already described.

The transducer I comprises, in this embodiment, as in the first embodiment described, a first synchro 2 mechanically coupled to the movable member 1. The rotor of the synchro rotates less than 180° for the whole stroke of the movable member. The stator of the first synchro 2 is fed with three phase current by means of the generator 5. This first synchro 2 thus delivers a signal $i_1$, the phase of which corresponds to the position of the movable member 1, but a signal $i_1$ is transformed in pulse series $i_2$, $i_2'$ by means of a pulse shaping circuit 4 (FIGURE 8) as previously described.

The transducer here, however, further comprises a second synchro 61, the rotor of which is mechanically connected to the movable member 1 by means of a gear reducer 62 so that this rotor makes one complete revolution for a displacement of the movable member 1 equal to a sub-multiple of its total stroke. The stator of this second synchro 61 is also fed with three phase current by means of the generator 5 so that the rotor of this second synchro 61 delivers an electrical signal $j_1$ the phase of which is function of the position of the movable member 1 within each sub-multiple of the total stroke of the movable member 1. This signal $j_1$ is transformed into a series of pulses $j_2$, $j_2'$, of short duration by means of a pulse shaping circuit 63 identical to the pulse shaping circuit 4 (FIGURE 8).

The signals $i_2'$ and $j_2'$ are delivered to the sequential counter II for recording the electronic graduations, whereas the signals $i_2$ and $j_2$ are delivered by means of an electronic switch 64, which passes only one of these signals at a time, to a delay circuit 7, the delay circuit delivers the signal $i_3$ constituting one of the input signals for the comparator V.

The electronic switch 64, shown in detail in FIGURE 15, is a Schmitt trigger 65 controlling two gate circuits 66, 67 fed respectively by the signals $i_2$ and $j_2$. According to the state of the Schmitt trigger 65, one or the other of the gate circuits 66, 67 is blocked. The state of the Schmitt trigger 65 is controlled by a signal $i_n$ delivered by the actuating device VI of the movable member 1 as will be understood from following portions of this specification.

The control selector IV comprises two selectors 32 and 32', each one permitting selection of one of the outputs of the counter 23. Each of these selector switches 32, 32' is connected by means of an electronic switch 93 to the pulse forming circuit 33. This electronic switch 93 is identical to the electronic switch 64 and is also controlled by the signal $i_n$. If the movable member is to be positioned, for example, in position "83," the operator sets the selector switch 32 on the 8th output of the counter 23 and the selector switch 32' on the third output of this same counter 23. In a first phase of the positioning of the movable member 1, controlled by means of the first electronic graduation, the signal $i_{c8}'$ will be delivered to the actuating device. When the movable member 1 has reached the figure "80," the "coarse adjustment" is completed, and the actuating device VI will deliver a pulse $i_n$ operating the electronic switches 64, 72 and 93 to their "fine control" condition. During this second phase of the positioning, controlled by the second electronic graduation, the signal $i_{c3}'$ will be delivered to the actuating device and the movable member 1 will be brought and maintained at the figure "83." In these examples, the counter comprises only one decade corresponding to an electronic graduation of ten magnetic spots. It is, however, evident that the counter 23 could, as in some of the preceding examples, comprise several decades. In this case, the selection device would comprise as many pairs of selector switches 32, 32' as the number of decades of the counter 23—i.e., the device illustrated for one decade would be multiplied a number of times equal to the number of decades of the counter 23. In a general way, the selection device comprises groups of selector switches, the number of which is equal to the number of decades of the counter 23, each of these groups comprising one selector switch for each electronic graduation and each graduation could be three or more.

The actuating device VI comprises as in the first embodiment (FIGURE 1) a servo-amplifier 35 fed by the error signal $i_e$ and controlling the motor 36 which drives the movable member 1 in its displacements. Furthermore, in this last embodiment, the actuating device VI comprises a discriminator 84 also fed by the error signal $i_e$. This discriminator comprises a low-pass filter, filtering the square waves of the error signal $i_e$ and delivering a signal whose level varies according to the length of the pulses of the error signal $i_e$. This variable level signal controls a bistable multivibrator which delivers the control pulse $i_n$ referred to above. In fact, this bistable multivibrator is placed in its initial state, for example, simultaneously with the "zero" resetting of the counter 23 by means of the switch 85. Then when the level of the signal delivered by the filter falls below a preset value, this bistable multivibrator changes its state, generating the control pulse $i_n$ which actuates the electronic switches 64 and 93.

The counter or sequential counting device II of this last embodiment comprises a magnetic memory including a rotary drum 8 driven by means of a motor 9, the drum drives the generator 5. This rotary drum 8 comprises a reference track 10, relative to the control of the positioning of the movable member, on which a fixed or variable reference position of the movable member 1 is recorded in the form of a magnetic spot through recording head 12 fed by the signal $i_2'$ when the push button switch 15 is actuated.

The rotary drum 8 also has a first control track 11 on which a first electronic graduation is recorded by means of recording head 13 fed by the signal $i_2'$ when the switch 15 is closed. The first electronic graduation comprises for example a thousand pulses corresponding to successive displacements of one millimeter of the movable member 1.

This magnetic drum 8 additionally has a second control track 68 on which a second electronic graduation is recorded by means of a recording head 61 fed by the signal $j_2'$ when the switch 15 is closed. This second electronic graduation comprises for example a thousand pulses corresponding to successive displacements of one micron of the movable member 1. Thus, the second electronic graduation corresponds to a displacement of the movable member 1 between two of its successive positions registered in the first electronic graduation.

Switches 88, 89, 90 are provided for feeding recording heads 12, 13 and 69 with the signals $i_2'$ and $j_2'$ respectively. Similarly, as in the first embodiment described, the fixed or the changing reference pulse recorded on the track 10 of the memory, is read by means of a reading head 16, and amplified through the reading amplifier 21 to give rise to the signal $I_r$ controlling the control circuit 24 of the counter 23. This reference pulse may be a changing one, that is to say that it can be modified after each stop of the movable member 1.

The first electronic graduation is read by means of reading head 17, and the signal resulting from this reading is amplified by the reading amplifier 22 to form the signal $I_g$ which is delivered to electronic switch 72. The second electronic graduation is read by reading head 70, then the signal obtained is amplified in reading amplifier 71 to form the signal $J_g$, which is delivered to the second input of the electronic switch 72. This electronic switch 72 is identical to the electronic switch 64 shown in FIGURE 15 and delivers a signal $I_h$ to the control circuit 24 of the counter 23. This electronic switch 64 is also controlled by the signal $i_n$ delivered by the discriminator 84 of the actuating device VI.

During operation of the control device just described, the signals $i_3$ and $I_h$ are derived in a first phase of the positioning of the movable member (unless said movable member is located outside of a range of $+1$ mm. around the desired stop position for example), from the signals $i_2$ and $I_g$ respectively. Then, as soon as the movable member is near its desired stop position (at a distance less than $+1$ mm. for example from the desired stop position) these signals $i_3$ and $I_h$ are derived in a second phase of the positioning of the movable member from the signals $j_2$ and $J_g$. The passage from one electronic graduation to the other corresponds thus to a change of scale.

However, during this passage from one graduation to the other, the counter 23, the control circuit 24 and the switch 43 are reset to zero. This is automatically effected by means of a monostable multivibrator 73 controlled by the signal $i_n$ which delivers to the above-mentioned elements 23, 24 and 43 a zero reset pulse upon the change of level of signal $i_n$.

In this last-mentioned embodiment, the signals $i_{a9}$ and $i_{a0}$, controlling respectively the switch 43 and the coincidence circuit 47, are received directly from the 9th and 1st output of the counter 23, respectively. These signals could be shaped in a pulse shaping circuit, as in the case in the first embodiment, shown in FIGURE 1, if necessary.

The precision of the machine can further be increased for the same stroke of the movable member 1, or the precision can be maintained with an increased stroke of movable member 1 by introducing two changes of scale in place of one. This requires merely using three synchros and three electronic graduations. In fact, it is recommended to provide for an overlapping of one decade between two successive electronic graduations to avoid any possible positioning error during the change of scale.

A further embodiment of the control system hereof is illustrated in FIGURES 16 and 17. The system here comprises transducer I, a counter II, a control selector IV, a comparator V, an actuating device VI as well as a survey device VII of the sequential counting device. The display device has been omitted to clarify the drawing.

The transducer I comprises as in the embodiment described with reference to FIGURE 14, a first synchro 2, mechanically connected to the movable member 1 and the rotor of which makes a rotation of 180° or less for the whole stroke of the movable member 1. The stator of this first synchro 2 is fed with three phase current by means of the generator 5. This first synchro 2 delivers a signal $i_1$, the phase of which corresponds to the position of the movable member 1 and signal 2 is transformed in a series of pulses $i_2$, $i_2'$ by means of a pulse shaping circuit 4 (FIGURE 8) as described previously.

Transducer I additionally includes a second synchro 61, the rotor of which is mechanically connected to the movable member 1 by means of gearing 62, and the rotor of which effects ten complete revolutions for the total displacement of the movable member 1, for example. The stator of the synchro 61 is also fed with three phase current by means of the generator 5 so that the rotor of this second synchro 61 delivers an electrical signal $j_1$ the phase of which is a function of the position of the movable member 1 inside a displacement corresponding to one-tenth of its total stroke. This signal $j_1$ is transformed into a series of pulses $j_2$ and $j_2'$ of short duration by means of a pulse shaping circuit 63, identical to the pulse shaping circuit 4 (FIGURE 8).

The signals $i_2'$ and $j_2'$ are delivered to the drum 8 for the recording of electronic graduations thereon whereas the signals $i_2$ and $j_2$ are delayed by means of corresponding delay circuits $7_g$ and $7_f$ which deliver respectively signals $i_3$ and $j_3$ to the comparator V.

The counter II comprises a coarse sequential counting section and a fine sequential counting section connected in parallel. These two sequential counting sections are identical and for convenience of explanation, the numbers relative to the coarse sequential counting will be provided with reference numerals having the index $g$, whereas the members of the fine sequential counting will be provided with reference numerals having the index $f$.

This counter II is like the counters of the other embodiments already described and includes a magnetic memory having a rotary drum 8 driven by a motor 9 and generator 5 driven by drum 8.

This drum 8 comprises a reference track $10_g$ on which a coarse reference position of the movable member 1 may be recorded in the form of a magnetic spot by means of recording head $62_g$, fed by the signal $i_2'$ when push button 15 is actuated. On drum 8, there is also reference track $10_f$ on which a fine reference position of the movable member 1 may be recorded in the form of a magnetic spot by means of a recording head $18_f$, fed by the signal $j_2'$ when push button 15 is depressed.

Here, magnetic drum 8 further has control tracks $11_g$ and $11_f$. There is recorded on this track $11_g$, by means of a recording head $13_g$ fed by the signal $i_2'$ when the switch $15_a$ is actuated, a coarse electronic graduation comprising, in the example shown, a hundred pulses corresponding to a hundred equally spaced positions of the movable member 1, distributed along its whole length. On control track $11_f$, there is recorded, by means of a recording head $13_f$, fed by the signal $j_2'$ when the push button $15_a$ is actuated, a fine electronic graduation comprising a hundred pulses, in the example shown, corresponding to a hundred positions of the movable member 1 uniformly distributed on a distance corresponding to one-tenth of its total travel.

The coarse and fine reference pulses, recorded on the tracks $10_g$ and $10_f$ are read by means of the reading heads $16_g$ and $16_f$ and amplified by means of the reading amplifiers $21_g$ and $21_f$ to give rise to signals $I_{rg}$ and $I_{rf}$ controlling the control circuits $24_g$ and $24_f$ of the coarse and fine counters $23_g$ and $23_f$ respectively.

The coarse and fine counters $23_g$ and $23_f$ comprise each two decades to count the hundred pulses relative to the coarse and fine electronic graduations respectively.

The control selector IV here comprises two coarse selector switches $32_g{}^2$ and $32_g{}^1$ corresponding each to one decade of the coarse counter $23_g$ and two fine selector switches $32_f{}^2$ and $32_f{}^1$ corresponding each to one decade of its fine counter $23_f$.

With these selector switches $32_g$ and $32_f$, one chooses the output of each of the counters $23_g$ and $32_f$ corresponding respectively to the first and second digits of the number representing the stopping position and the second and third digits of the number representing stopping position. It is to be noted that there is an overlapping of the two counting chains. In fact, the second digit of the wanted stopping figure is counted in the coarse counter $23_g$ as well as in the fine counter $23_f$.

This is due to the fact that in the example shown, coarse and fine electronic graduations overlap. In fact, they comprise each a hundred positions, the hundred positions of the fine electronic graduation extending on one-tenth of the distance covered by the coarse electronic graduation. In the illustrated case, one output of the coarse or fine counter is constituted by the combination of one output of the first decade with one output of the second decade of the corresponding counter.

The "AND" circuits $54_g$ and $54_f$ pass the signals $i_{cg}$, $i_{cf}$ of the counters $23_g$, $23_f$ as soon as one of the outputs of these counters has been selected in each of their decades by means of the selector switches $32_g$ and $32_f$. These "AND" circuits $54_g$ and $54_f$ deliver signals $i_{cg}'$ and $i_{cf}'$ which, after shaping by means of monostable multivibrators $94_g$, $94_f$ (FIGURE 17) respectively, are delivered to the comparator V.

The comparator V comprises a coarse phase comparator $34_g$ (FIGURE 17) comparing the signals $i_3$ delivered by the indicating device and $i_{cg}'$ delivered by the coarse selection device. The comparator $34_g$ delivers a coarse error signal $i_{eg}$. This comparator $34_f$ (FIGURE 17) comparing the signal $j_3$ delivered by the transducer and signal $i_{cf}'$ delivered by the fine selector control. This comparator $34_f$ delivers a fine error signal $i_{ef}$.

The actuating device VI comprises, as in a previous embodiment, an electric motor 36 controlled by means of a servoamplifier 35 fed by an error signal $I_e$. This error signal $I_e$ is derived from one or the other of the error signals $i_{eg}$ and $i_{ef}$ depending upon whether or not the movable member 1 is located in a position close to, or distant from, its stopping position. To this end, the two error signals $i_{eg}$ and $i_{ef}$ are delivered to an electronic switch 95 (FIGURE 17A), which passes only one of the error signals at a time. This electronic switch is similar to the electronic switches 64, 72 and 93 previously described, however, it comprises two channels. This electronic switch is controlled by control circuit 96 (FIGURE 17), the contact 97 of a relay of which is controlled by means of a discriminator 84 identical to the discriminator described previously. This discriminator 84 is fed by the error signal $I_e$ and delivers a signal $i_n$ when error signal $I_e$ falls below a predetermined level. The signal $i_n$ controls the electronic switch 95 by means of the control circuit 96 and thus the blocking of the error signal $i_{eg}$ and the passage of the error signal $i_{ef}$.

The operation of the different components of this embodiment is identical to the corresponding operations thereof described previously. In this embodiment, however, during the positioning of the movable member, the two sequential counting devices work simultaneously, but due to the use of electronic switch 95, the error signal $I_e$ is derived in a first phase of the positioning from the coarse error signal $i_{eg}$. This first phase of the positioning lasts until the movable member is located in a fine adjustment area—i.e., within an interval equal to one-tenth of its total travel inside which the desired stopping position is also located. From this moment the signal $i_n$, through electronic switch 95, blocks error signal $i_{eg}$, and causes delivery of the fine error signal $i_{ef}$, which from then on constitutes the error signal $I_e$ controlling the second phase of the positioning of the movable member 1. The commutation of scale is effected in this embodiment after the sequential counting device, so it is possible, without any risk of error, to register fine and coarse electronic graduations which do not overlap.

Therefore, this embodiment permits one to obtain, for the same number of pulses recorded in the magnetic memory, a greater precision than with the third embodiment of the positioning device, described above, all without any possibility of error during the change of scale.

This fourth embodiment also contemplates using a survey device VII. This survey device comprises a fine survey section checking the counter $23_f$ and a course survey section checking the counter $23_g$. These fine and coarse survey sections each comprise, as the one of the third embodiment, an electronic switch $43_f$, $43_g$, fed by the signals $I_{gf}'$, $I_{gg}'$ and set to zero by the signals $i_{c9f}{}^2$ and $i_{c9g}{}^2$ respectively. The signals delivered by these electronic switches $43_f$, $43_g$ are shaped in pulse shaping circuits $46_f$, $46_g$, which in turn, deliver signals $i_{vf}$, $i_{vg}$. These signals $i_{vf}$ and $i_{vg}$ are fed with the signals $i_{cof}'$ and $i_{cog}'$ to the "AND" circuit $97_g$, $97_f$ and if coincident, the signals $i_{cof}{}^2$, $i_{cof}{}^1$ and $i_{cog}{}^2$, $i_{cog}{}^1$ are delivered by the first output of each of the decades of the counter $23_f$, $23_g$, after having been shaped by means of monostable multivibrators $98_f{}^2$, $98_f{}^1$, and $98_g{}^2$, $98_g{}^1$. The coincidence of the signals $i_{vf}$, $i_{cof}'$ and $i_{vg}$, $i_{cog}'$ is realized by "AND" circuits $47_f$ and $47_g$. When coincidence of the signals $i_{vf}$, $i_{cof}'$ and $i_{vg}$, $i_{cog}$ occurs, the "AND" circuits $47_f$, $47_g$, deliver signals $i_{vf}'$, $i_{vg}'$ feeding a display $48_f$, $48_g$. These survey sections thus operate in a similar manner to that described in the preceding embodiments.

This fourth embodiment of the device uses two distinct counting chains, each fed by a corresponding electronic graduation. It is evident, however, that in particular cases, one could have three or more distinct counting chains. This depends on the positioning precision desired or required. Generally, there will always be as many electronic analogue graduations as counting chains, each of these electronic graduations being associated with one of the counting chains. Further, each counting chain will comprise a number of decades corresponding to the number of pulses of the corresponding electronic graduation.

Four embodiments and some variants of the control device according to the invention have been described by way of example, but after reading this specification it will be appreciated by those of ordinary skill in the art that various modifications can be made consistent herewith to achieve the advantages hereof. Further, it should be noted that the control selector of the second embodiment could be used instead of the one of the first, the third, or fourth embodiment. The same is true for the counters described.

FIGURE 18 shows very schematically a display device of the position reached by the movable member 1 used when a change of scale occurs as in the third of fourth embodiments above described.

This FIGURE 18 illustrates partially the sequential counting device II, the magnetic memory of which comprises a rotative drum 8 presenting on the one hand, two recording tracks for electronic graduations, the one $11_g$ on which a coarse electronic graduation is recorded and the other $11_f$ on which a fine electronic graduation is recorded. This rotative drum 8 comprises further two fixed reference tracks, the one $10_g$ recording a fixed coarse reference position and the other $10_f$ recording a fixed fine reference position. These two fixed fine and coarse reference positions correspond both with different precisions, to the initial or starting position of the movable member 1.

In a similar way to the one described with reference to the fourth embodiment, these fixed reference positions and these fine and coarse electronic graduations are read, then the signals thus obtained are amplified by means of reading amplifiers $21_f$, $21_g$, $22_f$, $22_g$ respectively. The signals $I_{rf}$ and $I_{gf}$ are delivered to a control circuit for the counter $24_f$ similar in all respects to the corresponding circuits already described with reference to the different embodiments. Similarly, the signals $I_{rg}$ and $I_{gg}$ are delivered to a control circuit of a counter $24_g$. This design is like the one described with reference to the fourth embodiment.

In the example of FIGURE 18, the fine and coarse electronic graduations comprise each a hundred pulses or positions and the device is designed to display safely all the positions included between 0 and 999. In fact, in this example, it is assumed that the two electronic graduations overlap on one decade. The coarse control circuit $24_g$ controls a coarse diplay counter $99_g$ comprising two decades ($99_g{}^1$, $99_g{}^2$) whereas the fine control circuit $24_f$ controls a fine display counter $99_f$ comprising also two decades ($99_f{}^1$ and $99_f{}^2$). The tens decade $99_g{}^1$ of the coarse display counter $99_g$ and the two decades $99_f{}^1$ and $99_f{}^2$ of the fine display counter $99_f$ each control a display device like one described with reference to the first embodiment of the control device fed by the outputs $A_{(0, 1 \ldots 9)}$ of the counter 23.

Survey devices or safety checks for the counters like those already described can be provided and signals $i_{tf}$ and $i_{tg}$ obtained through the shaping of the signals $i_{vf}'$ and $i_{vg}'$ delivered by the said survey devices of FIGURE 16. These signals $i_{tf}$ and $i_{tg}$ negative the corresponding display in a similar manner to the one described with reference to the first embodiment. It might be noted that the decade for the units $99_g{}^2$ of the coarse display counter does not control a display, since the digit displayed would be identical to the one displayed by the decade for the tens $99_f{}^1$ of the fine display counter.

The number of display counters working in parallel could be greater than two. Generally, the number of these display counters corresponds to the number of distinct electronic graduations. Further, the number of decades of each of these display counters depends on the number of pulses recorded in the corresponding electronic graduation.

It is further to be noted that in the case when the control system operates with a fixed reference position, the display counter can be avoided and the display device of the actual position may be directly controlled by the output of the control counter.

In various parts of the preceding description, reference has been made generally to specific circuit components and/or in detail to particular circuit networks. It will be understood that in the circuit diagrams of the drawings, rectangular blocks have been used in the detailed schematic views in place of, or to designate, resistors. Generally, the various embodiments should be readily understood bearing this factor in mind, as well as the explanation presented. Where parts or components have not been described in detail, they take the form of conventional circuits. For example, the output stage 33 is a monostable multivibrator such as the following: "Transistor Circuit Design" by J. A. Walston; J. R. Muller, Texas Instruments Inc.; McGraw-Hill editor 1963, pp. 380–381 ("Monostable Multivibrator"). Similarly, selector switch 25 is a conventional bistable multivibrator (see "Transistor Circuit Design" by J. A. Walston; J. R. Muller, Texas Instruments Inc.; McGraw-Hill editor 1963, pp. 373–377 ("Bistable Multivibrator")).

The input stage 27 of FIGURE 5 is a pulse shaping circuit which defines the D.C. voltage, the amplitude and the plurality of pulses $I_g$. The output of this stage, namely, pulses $I_g'$ are directed to the emitter of gate circuit 28. This gate is controlled at the base of the transistor by means of bistable multivibrator 25. Depending upon the two possible voltages of multivibrator 25, the transistor of gate 28 is in a conductive state or a non-conductive state, respectively. Output stage 29 is an emitter follower stage or common collector stage which provides a low impedance output.

With respect to FIGURES 6a, 6b and 6c, it should be apparent that the letters A and C are monostable multivibrators like output stage 33, whereas the letter B designates a conventional invertor circuit. In connection with FIGURE 13, $TR_1$ is a shaping circuit; $TR_2$ is a gate and $TR_3$, $TR_4$ are bistable multivibrators.

In FIGURE 15, numeral 65 designates a Schmitt trigger whereas numerals 66 and 67 designate identical gates. In FIGURE 15, $TR_1$ serves as a shaping means whereas $TR_2$ serves as a gate controlled by Schmitt trigger 65.

Turning to FIGURE 17, numerals 94f and 94g designate monostable multivibrators, numerals 34f and 34g designate bistable multivibrators and numeral 96 designates a Schmitt trigger with all of these circuit components being of corresponding design to those referred to immediately above.

Having now described various embodiments of the invention in considerable detail, it should be apparent that the objects set forth at the outset of the present specification have been successfully achieved and that the system hereof affords substantial advantages over prior art systems while being versatile to accommodate various precisions and different types of input information. Accordingly, we claim:

1. An electronic control system for positioning a movable member, said system comprising transducer means for producing a signal representative of the actual position of the movable member, an actuating device for displacing said movable member, sequential counting means, memory means storing at least one analogue electronic endless graduation of signals corresponding to a succession of positions of the movable member, a reader for delivering pulse trains representing repetitive readings of the signals of said graduation, a counter receiving said pulse trains, said counter having a number of outputs corresponding to the number of divisions of the said graduation and thus to the number of pulses contained in each pulse train, said counter delivering on each output pulses corresponding to the order number of the said output; selector means for delivering a signal from at least one of the said outputs of said counter, and comparator means for comparing the signals delivered by the transducer means and the signals delivered from a selected output of the counter, said comparator yielding an error signal, and means connecting said comparator to said actuating device whereby said error signal controls said actuating device and in turn movement of said member.

2. The system defined in claim 1 wherein the analogue electronic graduation comprises signals delivered by said transducer means and corresponding to the actual position of the movable member for successive well defined positions thereof.

3. The system defined in claim 2 further including display means receiving control signals from said counter and said transducer means and producing from said control signals at each instant an indication corresponding to the actual position of the movable member.

4. The system defined in claim 3 wherein said display device further includes means producing a display of the selected position of the movable member.

5. The system defined in claim 2 further including survey means for verifying at each instant the proper operation of said counter, said survey means producing an output signal derived from signals received from said counter.

6. The system defined in claim 5 and further including control means for stopping said movable member, and wherein said output signal activates said control means.

7. The system defined in claim 5 wherein said survey means includes visable display means and said output signal controls said visable display means.

8. The system defined in claim 1 wherein said selector means includes switching means adjustable to deliver an output from said selector means corresponding to the desired position of the movable member.

9. The system defined in claim 8 wherein said memory means further has stored thereon a signal corresponding to a reference position of the movable member, said last mentioned signal serving as a start control for said counter.

10. The system defined in claim 8 wherein said reference position is adjustable.

11. The system defined in claim 10 further including display means for displaying the actual position of the movable member, said display means comprising a display counter responsive to a signal representing said reference position, said display counter and said transducer means operating said display device to deliver at each instant an indication corresponding to the position then reached by the movable member.

12. The system defined in claim 9 further including a control circuit receiving both said pulse train and a signal corresponding to said reference position, said control circuit initiating operation of said counter when the signal corresponding to the said reference position is delivered to it.

13. The system defined in claim 5 further including means for survey verifying at each instant proper operation of said counter, said survey means delivering an output signal dependent upon the operation of said counter, said survey means comprising a bistable multivibrator fed by a signal being delivered to the counter and by a signal from the last output of the first decade of said counter.

14. The system defined in claim 3 including an error means, and wherein said output signal delivered by the said survey means controls said error means, said survey means comprising a coincidence circuit delivering said output signal when fed simultaneously with a signal from said bistable multivibrator and by a signal from the first output of the counter.

15. The system defined in claim 14 wherein said error means comprises an error display responsive to the absence of said output signal to indicate an error.

16. The system defined in claim 14 wherein said error means comprises switching means coupled with said actuating device, said switching means being responsive to the absence of said output signal to deactivate said actuating means.

17. The system defined in claim 12 wherein said transducer means includes means for producing two output signals, one output signal being a coarse signal having a period corresponding to at least twice the total stroke of said movable member and the other output signal being a fine signal having a period corresponding to a sub-multiple of the said stroke.

18. The system defined in claim 7 wherein said magnetic memory means stores two electronic analogue graduations, one corresponding to a succession of coarse signals and the other to a succession of fine signals.

19. The system defined in claim 18 wherein electronic analogue graduation of fine signals is endless and corresponds to a displacement of the movable member equal to the interval between two successive positions recorded as the electronic graduation of coarse signals.

20. The system defined in claim 18 wherein electronic analogue graduation of fine signals corresponds to a displacement of the movable member equal to the interval covered by ten successive positions recorded as the electronic graduation of coarse signals.

21. The system defined in claim 20 further including electronic switching means for switching the feed of signals to said counter from said first electronic analogue graduation to said second electronic analogue graduation as said movable member approaches nearly its selected position and simultaneously switching the comparator means from connection with the coarse signal to connection with the fine signal delivered by said transducer means.

22. The system defined in claim 21 wherein said selector means comprises switching means for selecting one output of the counter, said switching means being equal in number to the number of electronic graduations, and wherein said electronic switching device connects at each instant the selected output of the counter corresponding to the electronic graduation feeding the counter to the comparator means.

23. The system defined in claim 18 wherein said counter comprises a number of counting chains equal to the number of recorded electronic graduations, wherein all said chains operate simultaneously in parallel, and including an electronic switch for determining from the position of the movable member, which one of said counting chains controls the displacement of the movable member at any given instant.

24. The system defined in claim 12 wherein said display means comprises coincident elements, the number of which is equal to the number of outputs of the counter, wherein said coincident elements are each fed by one of said outputs and simultaneously by a signal delivered by said transducer means, only one of said coincidence elements being operative at any given instant to simultaneously receive such signals and deliver an output signal and wherein said display means includes position display elements controlled by delivered output signals from said coincident elements.

25. The system defined in claim 24 wherein said display means comprises further a second set of coincidence elements connected in series between the first set of coincidence elements and said position display elements, said second set of coincidence elements being fed by output signals from the coincidence circuit of the counter survey means whereby in the absence of an output signal from said coincidence circuit corresponding to improper operation of the counter, the display is suppressed.

26. A device as claimed in claim 12, wherein said selector means comprises selector switches for selectively connecting one of the outputs of each decade of the counter to the comparator.

27. The system defined in claim 12 wherein said selector means comprises a numeric control device having a data introducing means for supplying in coded form the desired stop positions of the movable member.

28. The system defined in claim 27 wherein said selector means comprises a punched tape carrying thereon in coded form the information relative to the desired position of the movable member, a stepping motor for driving said tape, said stepping motor being controlled by a pulse generator, said coded information comprising one group of perforations for each digit of the number representing the desired stop position of the movable member.

29. The system defined in claim 28 wherein said selector means includes a decoder for transforming successively each group of perforations into an electrical signal delivered to a selected output of the decoder depending on the digit represented by the group of perforations under examination by said selector means.

30. The system defined in claim 29 including a ring counter fed by said pulse generator, said ring counter comprising as many outputs as the number of digits of the number representing the desired stop position of the movable member and delivers successively a signal to each of its outputs.

31. The system defined in claim 30 wherein said selector means comprises a register constituted by a matrix comprising ten rows corresponding to the output of the decades and as many columns as the number of digits included in the number representing the desired stop position of the movable member corresponding to the output of the ring counter, coincidence circuits forming the intersections between the rows and the columns each fed by the corresponding row and column, each of said coincidence circuits, at least one gate controlled by each coincidence circuit and controlling in its turn the corresponding output of the counter fed by signals corresponding to the analogue graduation.

References Cited
UNITED STATES PATENTS

| | | | |
|---|---|---|---|
| 3,164,819 | 1/1965 | Rantsch et al. | 340—172.5 |
| 3,286,085 | 11/1966 | Rado | 340—172.5 |
| 3,291,971 | 12/1966 | Dunne | 235—151.1 |
| 3,324,281 | 6/1967 | Morse | 340—172.5 |

ROBERT C. BAILEY, *Primary Examiner.*

G. SHAW, *Assistant Examiner.*